(12) United States Patent
Divakaran et al.

(10) Patent No.: US 11,934,793 B2
(45) Date of Patent: Mar. 19, 2024

(54) SYSTEM AND METHOD FOR CONTENT COMPREHENSION AND RESPONSE

(71) Applicant: SRI International, Menlo Park, CA (US)

(72) Inventors: Ajay Divakaran, Monmouth Junction, NJ (US); Karan Sikka, Lawrenceville, NJ (US); Yi Yao, Princeton, NJ (US); Yunye Gong, West Windsor, NJ (US); Stephanie Nunn, Hopkins, MN (US); Pritish Sahu, Piscataway, NJ (US); Michael A. Cogswell, West Windsor, NJ (US); Jesse Hostetler, Boulder, CO (US); Sara Rutherford-Quach, San Carlos, CA (US)

(73) Assignee: SRI International, Menlo Park, CA (US)

( * ) Notice: Subject to any disclaimer, the term of this patent is extended or adjusted under 35 U.S.C. 154(b) by 319 days.

(21) Appl. No.: 17/516,409

(22) Filed: Nov. 1, 2021

(65) Prior Publication Data
US 2022/0138433 A1 May 5, 2022

Related U.S. Application Data

(60) Provisional application No. 63/109,282, filed on Nov. 3, 2020.

(51) Int. Cl.
*G06F 40/35* (2020.01)
*G06F 16/33* (2019.01)
*G06N 5/04* (2023.01)

(52) U.S. Cl.
CPC .......... *G06F 40/35* (2020.01); *G06F 16/3335* (2019.01); *G06N 5/04* (2013.01)

(58) Field of Classification Search
CPC ........ G06F 40/35; G06F 16/3335; G06N 5/04
See application file for complete search history.

(56) References Cited

U.S. PATENT DOCUMENTS

| 2014/0358922 | A1* | 12/2014 | Alkov | G06F 16/3329 |
| | | | | 707/737 |
| 2018/0260472 | A1* | 9/2018 | Kelsey | G06F 40/56 |
| 2021/0397634 | A1* | 12/2021 | Gerber, Jr. | G06F 16/353 |

OTHER PUBLICATIONS

Yu, Licheng & Park, Eunbyung & Berg, Alexander & Berg, Tamara, "Visual Madlibs: Fill in the blank Image Generation and Question Answering", (2015), 10.1109/ICCV.2015.283, (https://arxiv.org/abs/1506.00278).

(Continued)

*Primary Examiner* — Bhavesh M Mehta
*Assistant Examiner* — Darioush Agahi
(74) *Attorney, Agent, or Firm* — MOSER TABOADA

(57) ABSTRACT

A method, apparatus and system for training an embedding space for content comprehension and response includes, for each layer of a hierarchical taxonomy having at least two layers including respective words resulting in layers of varying complexity, determining a set of words associated with a layer of the hierarchical taxonomy, determining a question answer pair based on a question generated using at least one word of the set of words and at least one content domain, determining a vector representation for the generated question and for content related to the at least one content domain of the question answer pair, and embedding the question vector representation and the content vector representations into a common embedding space where vector representations that are related, are closer in the embedding space than unrelated embedded vector representations. Requests for content can then be fulfilled using the trained, common embedding space.

20 Claims, 16 Drawing Sheets

(56) References Cited

OTHER PUBLICATIONS

Tapaswi, Makarand & Zhu, Yukun & Stiefelhagen, Rainer & Torralba, Antonio & Urtasun, Raquel & Fidler, Sanja, "MovieQA: Understanding Stories in Movies through Question-Answering", (2016), 10.1109/CVPR.2016.501, (http://moviega.cs.toronto.edu/home/).

A. Kembhavi, M. Seo, D. Schwenk, J. Choi, A. Farhadi and H. Hajishirzi, "Are You Smarter Than a Sixth Grader? Textbook Question Answering for Multimodal Machine Comprehension," 2017 IEEE Conference on Computer Vision and Pattern Recognition (CVPR), 2017, pp. 5376-5384, doi: 10.1109/CVPR.2017.571, (http://ai2-website.s3.amazonaws.com/publications/CVPR17 TQA.pdf).

Ebrahimi Kahou, Samira, et al. "FigureQA: An annotated figure dataset for visual reasoning." arXiv e-prints (2017): arXiv-1710, (https://arxiv.org/abs/1710.07300).

Iyyer, Mohit & Manjunatha, Varun & Guha, Anupam & Vyas, Yogarshi & Boyd-Graber, Jordan & Daume, Hal & Davis, Larry, "The Amazing Mysteries of the Gutter: Drawing Inferences Between Panels in Comic Book Narratives", (2017), 6478-6487. 10.1109/CVPR.2017.686, (https://arxiv.org/abs/1611.05118).

Yagcioglu, Semih & Erdem, Aykut & Erdem, Erkut & Ikizler, Nazli. "RecipeQA: A Challenge Dataset for Multimodal Comprehension of Cooking Recipes." (2018), (https://hucvl.github.io/recipegs/).

Zellers, Rowan, et al. "From recognition to cognition: Visual commonsense reasoning." Proceedings of the IEEE/CVF conference on computer vision and pattern recognition, (2019), (https://arxiv.org/abs/1811.10830).

Zellers, Rowan et al. "Turing Advice: A Generative and Dynamic Evaluation of Language Use." NAACL (2021), (https://arxiv.org/abs/2004.03607).

* cited by examiner

SYSTEM AND METHOD FOR CONTENT COMPREHENSION AND RESPONSE

CROSS-REFERENCE TO RELATED APPLICATIONS

This application claims benefit of and priority to U.S. Provisional Patent Application Ser. No. 63/109,282, filed Nov. 3, 2020, which is herein incorporated by reference in its entirety.

FIELD

Embodiments of the present principles generally relate to a method, apparatus and system for content comprehension and response and, more particularly, to a method, apparatus and system for content comprehension and response implementing a hierarchical knowledge taxonomy.

BACKGROUND

Content understanding today consists of answering questions about the content with no regard to the difficulty of the questions or any other relationship between the questions. The state of the art consists of systems that use neural networks to memorize answers to questions. For example, a Visual question answering (VQA) system assumes the task of answering questions based on an image or video. The approaches to VQA are largely statistical, with no notion of relative difficulty of questions. GQA systems include datasets that include categorization by semantics (query, verify, logical, choose, compare) and structures (global, attribute, object, relation, category). Such categorization, however, is based on underlying scene graphs and are not grounded in a scientific definition of comprehension.

The content understanding of current systems consists of answering questions about different types of content with no regard to the difficulty of the questions or any other relationship between the questions. That is, existing systems can use neural networks to memorize answers to questions, but there is no ability in such systems to answer similar question or questions on similar topics where the neural network or machine learning system was not trained specifically on those particular question answer pairs.

SUMMARY

Embodiments of methods, apparatuses and systems for content comprehension and response implementing a hierarchical knowledge taxonomy including question answer pair adaptation are disclosed herein.

In some embodiments a method for training an embedding space for content comprehension and response includes for each layer of a hierarchical taxonomy having at least two layers including respective words resulting in layers of varying complexity, determining a set of words associated with a layer of the hierarchical taxonomy, determining a question answer pair based on a question generated using at least one word of the set of words and at least one content domain to which the question is applied, determining a vector representation for the generated question and for content related to the at least one content domain of the question answer pair, and embedding the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations. In some embodiments of the method of the present principles, the common embedding space includes embedded question answer pairs for each of the at least two layers of the hierarchical taxonomy, such that a relationship between embedded question answer pairs of varying complexity can be determined.

In some embodiments, the generating the question of the above described method includes determining at least one stem question for a word of the set of words, and determining at least one respective domain adapted question for at least one stem question based on the at least one content domain.

In some embodiments in accordance with the present principles, a method for content comprehension and response of a content collection includes receiving a question directed to the content collection, determining a question vector representation of the received question, projecting the determined question vector representation into a trained common embedding space in which question vector representations and respective content vector that are related, are closer together in the common embedding space than unrelated question vector representations and content vector representations, and determining a distance measure between the determined question vector representations projected into the common embedding space and respective embedded question vector representations in the common embedding space using a distance function to identify content related to the received question. In some embodiments of the above described method, the common embedding space is trained by selecting a hierarchical taxonomy having at least two layers including respective words resulting in layers of varying complexity, and for each layer of the hierarchical taxonomy, determining a set of words associated with a layer of the hierarchical taxonomy, determining a question answer pair based on a question generated using at least one word of the set of words and at least one content domain to which the question is applied, determining a vector representation for the generated question and for content related to the at least one content domain of the question answer pair, and embedding the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations. In some embodiments, the common embedding space comprises embedded question answer pairs for each of the at least two layers of the hierarchical taxonomy, such that a relationship between embedded question answer pairs of varying complexity can be determined.

In some embodiments in accordance with the present principles, a non-transitory machine-readable medium has stored thereon at least one program, the at least one program including instructions which, when executed by a processor, cause the processor to perform a method in a processor based system for content comprehension and response of a content collection including for a received question directed to the content collection, determining a question vector representation of the received question, projecting the determined question vector representation into a trained common embedding space in which question vector representations and respective content vector that are related, are closer together in the common embedding space than unrelated question vector representations and content vector representations, and determining a distance measure between the determined question vector representations projected into the common embedding space and respective embedded question vector representations in the common embedding space using a distance function to identify content related to the received question. In some embodiments, the common embedding space is trained by, for each layer of a hierarchical taxonomy having at least two layers including respective words resulting in layers of varying complexity, determining a set of words associated with a layer of the hierarchical taxonomy, determining a question answer pair based on a question generated using at least one word of the set of words and at least one content domain to which the question is applied, determining a vector representation for the generated question and for content related to the at least one content domain of the question answer pair, and embedding the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations. In some embodiments, the common embedding space comprises embedded question answer pairs for each of the at least two layers of the hierarchical taxonomy, such that a relationship between embedded question answer pairs of varying complexity can be determined.

In some embodiments, a system for training an embedding space for content comprehension and response includes a processor and a memory coupled to the processor, the memory having stored therein at least one of programs or instructions executable by the processor to configure the system to, for each layer of a hierarchical taxonomy having at least two layers including respective words resulting in layers of varying complexity, determine a set of words associated with a layer of the hierarchical taxonomy, determine a question answer pair based on a question generated using at least one word of the set of words and at least one content domain to which the question is applied, determine a vector representation for the generated question and for content related to the at least one content domain of the question answer pair, and embed the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations. In some embodiments, the common embedding space includes embedded question answer pairs for each of the at least two layers of the hierarchical taxonomy, such that a relationship between embedded question answer pairs of varying complexity can be determined.

In some embodiments, the generating the question of the above described system includes determining at least one stem question for a word of the set of words, and determining at least one respective domain adapted question for at least one stem question based on the at least one content domain.

In some embodiments, a system for content comprehension and response of a content collection includes a processor and a memory coupled to the processor, the memory having stored therein at least one of programs or instructions executable by the processor to configure the system to, receive a question directed to the content collection, determine a question vector representation of the received question, project the determined question vector representation into a trained common embedding space in which question vector representations and respective content vector that are related, are closer together in the common embedding space than unrelated question vector representations and content vector representations, determine a distance measure between the determined question vector representations projected into the common embedding space and respective embedded question vector representations in the common embedding space using a distance function to identify content related to the received question.

In some embodiments, in the above described system, the common embedding space is trained by, for each layer of a hierarchical taxonomy having at least two layers including respective words resulting in layers of varying complexity, determining a set of words associated with a layer of the hierarchical taxonomy, determining a question answer pair based on a question generated using at least one word of the set of words and at least one content domain to which the question is applied, determining a vector representation for the generated question and for content related to the at least one content domain of the question answer pair, and embedding the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations. In some embodiments, the common embedding space comprises embedded question answer pairs for each of the at least two layers of the hierarchical taxonomy, such that a relationship between embedded question answer pairs of varying complexity can be determined.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
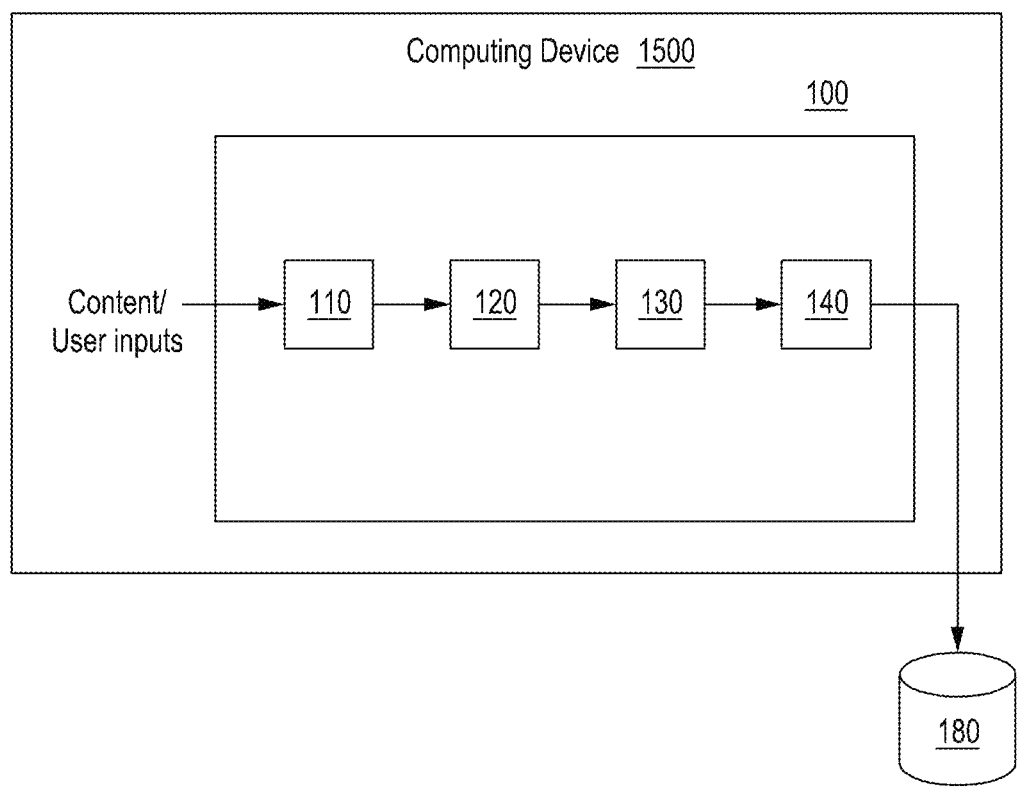
FIG. 1 depicts a high-level block diagram of a content comprehension and response system 100 in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for content comprehension and response implementing a hierarchical knowledge representation/taxonomy including question answer pair adaptation. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to a specific hierarchical knowledge representation and associated content, such teachings should not be considered limiting. Embodiments in accordance with the present principles can function with substantially any content and can include other, not shown, hierarchies.

Embodiments of the present provide a systematic graded approach to knowledge acquisition that, in some embodiments, consists of a task-design hierarchical framework, dataset collection driven by the task design and baseline machine learning processes/algorithms, and a roadmap for further development of algorithms. That is, embodiments of the present principles can implement existing or new hierarchies to set up a graded set of tasks that systematically advance difficulty capabilities, test multimodal comprehension (e.g., use text to learn and images to test and vice versa), test across domains (e.g. applying lessons learned from for example, story A to comprehension of story B), and systematically incorporate knowledge bases.

Embodiments of the present principles can be applied to a number of different domains that utilize content comprehension, such as semantic content retrieval from the web, automatic document summarization, multimodal human computer interaction, and the like. For example and as will be described in greater detail below, a content comprehension system of the present principles can be implemented to answer questions on a recipe or provide a new recipe or alternatively can be implemented to provide feedback or answer questions regarding a story. Embodiments of the methods, apparatuses and systems of the present principles can be applied to substantially any content data including multimodal content data sets comprising text, images, video, audio or any combination thereof.

FIG. 1 depicts a high-level block diagram of a content comprehension and response system 100 in accordance with an embodiment of the present principles. The content comprehension and response system 100 of FIG. 1 illustratively comprises a question/answer generation module 110, a computational module 120, an embedding module 130, an optional adaptation module 140, and a storage device 180.

As further depicted in FIG. 1, embodiments of a content comprehension and response system of the present principles, such as the content comprehension and response system 100 of FIG. 1, can be implemented via a computing device 1500 in accordance with the present principles (described in greater detail below).

Figure 2:
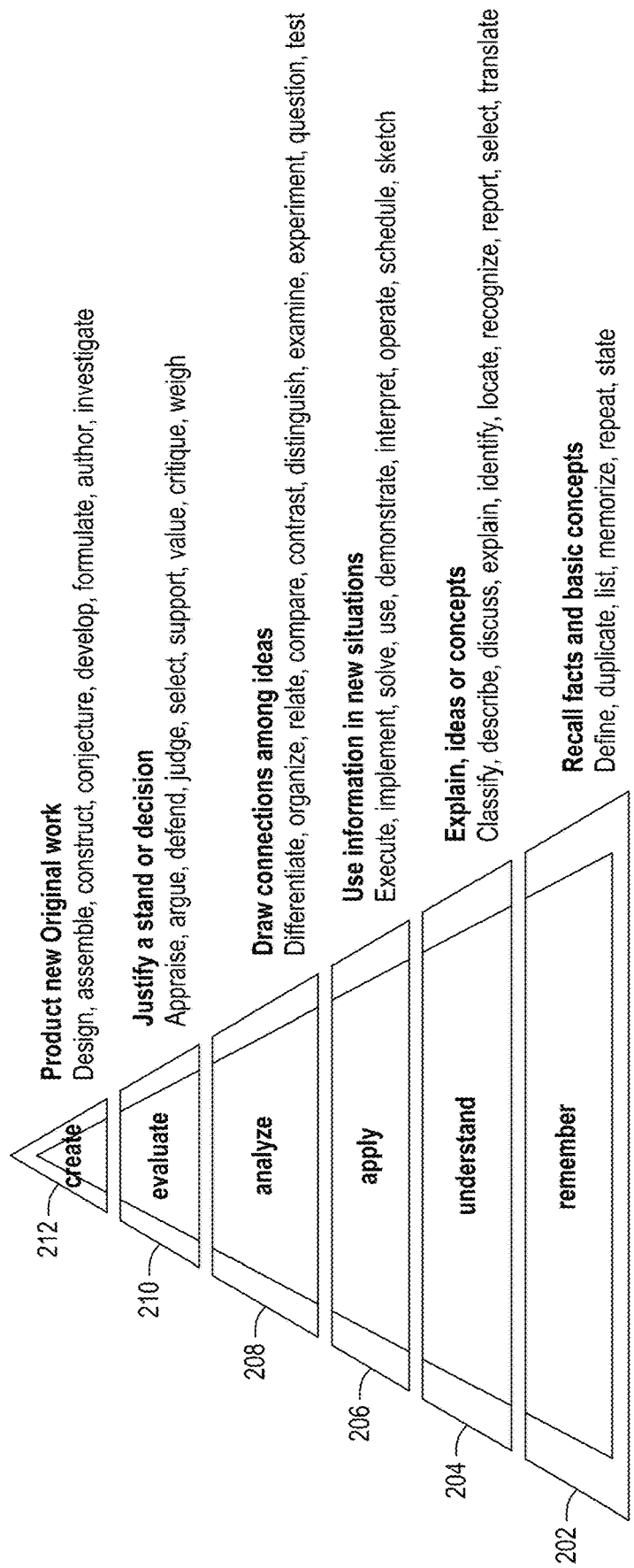
FIG. 2 depicts a graphical representation of an exemplary hierarchical taxonomy that can be implemented by a content comprehension and response system of the present principles in accordance with an embodiment of the present principles.

FIG. 2 depicts a diagram of an exemplary hierarchical representation/taxonomy 200 that can be implemented by a content comprehension and response system of the present principles, such as the content comprehension and response system 100 of FIG. 1, in accordance with an embodiment of the present principles. The hierarchical taxonomy 200 of FIG. 2 is illustratively a Bloom's Hierarchy or Taxonomy. The Bloom's Hierarchy/Taxonomy provides a hierarchical taxonomy of skills which the assumption is that one progresses thru the hierarchy by gaining proficiency/mastery at each level. Each level of hierarchy can have a set of words associated with it, and in the embodiment of FIG. 2 the words are verbs. Each level also includes question stems or certain questions that require answers. While Bloom's Hierarchy is described with respect to FIG. 2, it should be understood that any hierarchical taxonomy can be utilized in a system, apparatus and method for content comprehension and response in accordance with the present principles.

In the illustrative embodiment of FIG. 2, the hierarchical taxonomy comprises six (6) layers including a remember layer 202, an understanding layer 204, an application layer 206, an analysis layer 208, an evaluation layer 210, and a create layer 212, in ascending order. In the embodiment of FIG. 2, the remember layer 202 can be used to recall facts and basic concepts and can typically be associated with stem words/verbs including, but not limited to define, duplicate, list, memorize, repeat, and state. The understanding layer 204 of FIG. 2 can be used to explain ideas or concepts and can typically be associated with words/verbs including but not limited to classify, describe, discuss, explain, identify, locate, recognize, report, select, and translate. The application layer 206 can be used to use information in new situations and can typically be associated with words/verbs including but not limited to execute, implement, solve, use, demonstrate, interpret, operate, schedule, and sketch. In the embodiment of FIG. 2, the analysis layer 208 can be used to draw connections among ideas and can typically be associated with words/verbs including but not limited to differentiate, organize, relate, compare, contrast, distinguish, examine, experiment, question, and test. The evaluation layer 210 can be used to justify a stand or decision and can typically be associated with words/verbs including but not limited to appraise, argue, defend, judge, select, support, value, critique, and weigh. As further depicted in the embodiment of FIG. 2, the create layer 212 can be used to produce new or original work and can typically be associated with words/verbs including but not limited to design, assemble, construct, conjecture, develop, formulate, author, and investigate.

Although in the embodiment of FIG. 2, the hierarchical taxonomy 200 illustratively comprises six layers in ascending order of complexity/difficulty, in alternate embodiments, a hierarchical taxonomy of the present principles can include other numbers of layers having random levels of complexity/difficulty. In accordance with the present principles, a most fundamental hierarchical taxonomy of the present principles can include at least two layers, in which the layers have different levels of complexity/difficulty. That is, as recited above each layer of a hierarchical taxonomy of the present principles have a set of words associated with the layer. The words, when applied to a respective layer, result in a level of complexity/difficulty for a respective layer resulting from what kinds of words are associated with each layer (described in greater detail below).

Figure 3:
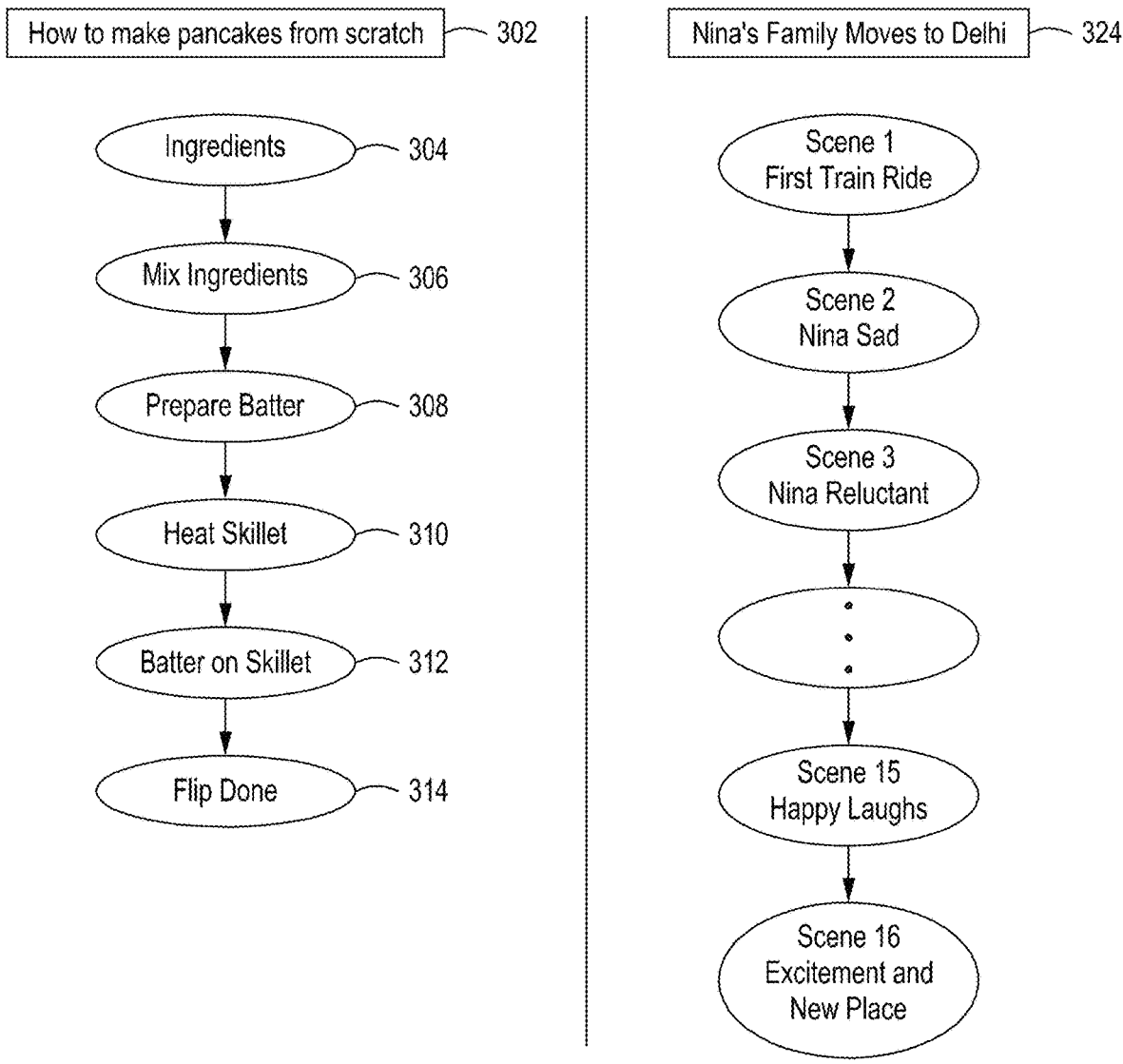
FIG. 3 depicts two examples of content that can be received and processed by a content comprehension and response system of the present principles as applied to a first layer, a remember layer, of the hierarchical taxonomy of the embodiment of FIG. 2 in accordance with an embodiment of the preset principles.

FIG. 3 depicts two examples of content that can be received and processed by a content comprehension and response system of the present principles, such as the content comprehension and response system 100 of FIG. 1. The content of FIG. 3 can be received by the question/answer generation module 110 of the content comprehension and response system 100 of FIG. 1 and can be processed with respect to each layer of a hierarchical taxonomy of the present principles, such as the hierarchical taxonomy of FIG. 2. In the embodiment of FIG. 3, the first content example 302 comprises a recipe for making pancakes from scratch. In accordance with the present principles, such information/content data can be input to a content comprehension and response system of the present principles via an input device of, for example, the computing device 1500 or can determined by a content comprehension and response system of the present principles from content data received. In the first example 302 of FIG. 3, such information/data for making pancakes from scratch can include, but is not limited to, information/data regarding ingredients needed for making pancakes from scratch 304, information/data regarding how to mix the ingredients 306, information/data on how to prepare the batter 308, information/data on how to heat the skillet for cooking the pancakes 310, information/data on how to put the batter on the heated skillet 312, information/data on how to flip and remove the pancake from the heated skillet 314. The question/answer generation module 110 of the content comprehension system 100 of FIG. 1 can cause the information/content data received/determined to be stored in, for example, the storage device 180 associated with the content comprehension system 100 of FIG. 1.

The second example 324 depicted in FIG. 3 comprises a story entitled Nina's Family Moves to New Delhi. In accordance with the present principles, such information/content data can be input to a content comprehension and response system of the present principles via an input device of, for example, the computing device 1500 or can determined by a content comprehension and response system of the present principles from content data received. As depicted in FIG. 3, information/content data associated with the story can include, but is not limited to, information/content data regarding various scenes of the story and illustratively a Scene 1 depicting a first train ride, a Scene 2 depicting a character, Nina, being sad, a Scene 3 depicting Nina's reluctance to the family's move to New Delhi, a Scene 15 depicting Nina and her family laughing, a Scene 16 depicting excitement of Nina and her family at the new home/place, and some unspecified Scenes in between Scene 3 and Scene 15. The question/answer generation module 110 of the content comprehension system 100 of FIG. 1 can cause the information/data received/determined with respect to the second example of FIG. 3 to be stored in, for example, the storage device 180 associated with the content comprehension system 100 of FIG. 1. In the embodiment of FIG. 3, the first example, the pancake recipe, includes data structures and methods including steps and the second example, the story about Nina, includes people, scenes and events that occur in each scene of the story.

Figure 4:
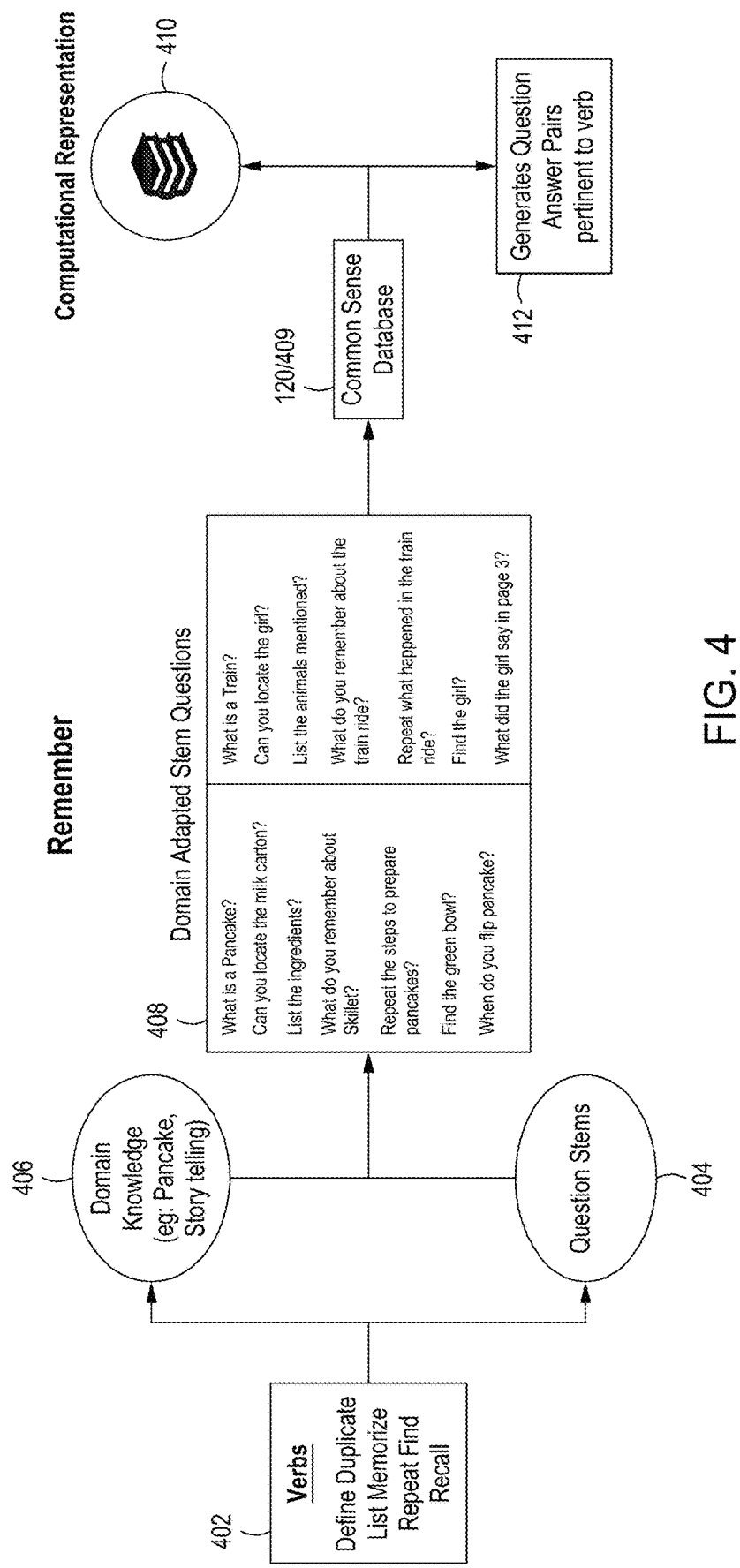
FIG. 4 depicts a functional diagram of components of the content comprehension system of FIG. 1 in accordance with an embodiment of the present principles.

FIG. 4 depicts a functional diagram of components of the content comprehension system 100 of FIG. 1, such as the question/answer generation module 110, the computational module 120 and the embedding module 130 as applied to the first layer (remember layer) of the hierarchical taxonomy of FIG. 2 in accordance with an embodiment of the present principles. As described with respect to FIG. 2, there are words (illustratively verbs) 402 associated with the remember layer 202 of the Bloom's taxonomy. In some embodiments, a user can generate stem questions 404 from the verbs 402 associated with the layer of the Bloom's taxonomy layer. In alternate embodiments of the present principles, the stem questions can be learned and remembered from previous applications of a content comprehension system of the present principles.

The question/answer generation module 110 of the content comprehension system 100 of FIG. 1 applies the determined stem questions 404 to different instances of stored domain knowledge 406 to generate domain adapted stem questions 408. More specifically, as described above, content received by the content comprehension system 100 of FIG. 1 can be stored in the storage device 180. As recited above stem questions can be determined from the verbs associated with, for example, the remember layer 202. For example, in the embodiment of FIG. 4, the remember layer 202 includes the verb "list". In accordance with the present principles, an exemplary stem question that can be determined for the verb "list" can include "list the ingredients". In some embodiments, the question/answer generation module 110 can apply the stem question, for example "list the ingredients" to the content data in the storage device 180 to determine domain adapted stem questions 408. For example, in some embodiments, the storage device can include a plurality of recipes for making pancakes from scratch. The stem question, "list the ingredients", can then be applied to the content domain of "making pancakes from scratch" to generate a domain adapted stem question of "list the ingredients for making pancakes from scratch".

In some embodiments of the present principles, the question/answer generation module 110 can implement rules and/or a machine-learning process to generate the domain adapted stem questions 408 from stem questions for each layer of a hierarchical taxonomy. Alternatively or in addition, in some embodiments a human can generate the domain adapted stem questions by applying stem questions to relevant content domains of, for example, content stored in the storage device 180. In yet alternate embodiments, a machine-learning process can be implemented to determine domain adapted stem questions 408 in embodiments in which a user adds to or modifies the domain knowledge applied, for example, by changing a recipe from a pancake recipe to a crepe recipe and/or by adding to or modifying the stem questions (described in greater detail below).

In the embodiment of FIG. 4, the verbs associated with the remember layer illustratively include define, duplicate, list, memorize, repeat, find and recall, and the determined, respective domain adapted stem questions for the pancake example include What is a Pancake? Can you locate the milk carton?, List the ingredients for making pancakes?, What do you remember about the skillet?, Repeat the steps to prepare pancakes?, Find the green bowl?, and When do you flip the pancake?.

In the embodiment of FIG. 4, the determined, respective domain adapted stem questions for the example regarding Nina's story include What is a Train?, Can you locate the girl?, List the animals mentioned?, What do you remember about the train ride?, Repeat what happened in the train ride?, Find the girl?, and What did the girl say in page 3?

In the embodiment of FIG. 4, a common sense database 409 can be used to store information/data regarding content domains used for generating respective domain adapted stem questions and differences between a specific content domain and other, different content domains (described in further detail below). In some embodiments, the common sense database 409 can comprise a reserved section(s) of the storage device 180. Alternatively or in addition, the common sense database 409 can comprise a separate storage device (not shown).

As further depicted in FIG. 4, information/data regarding the determined domain adapted stem questions and information regarding the content and the content domain related to each of the domain adapted stem questions, for example stored in the common sense database 409, is used to generate a computational representation 410. A computational representation 410 of the present principles represents content information including at least content domain information, temporal information and the like, which can be used to relate content in different layers of the hierarchical taxonomy of the present principles (described in greater detail below). In some embodiments of the present principles a computational representation can be generated by applying algorithms to content to determine representations of the content including associated content information. In some embodiments of the present principles, a computational representation 410 can be generated by the computational module 120 of the content comprehension system 100 of FIG. 1.

In accordance with the present principles, because computational representations can be generated for content in content domains associated with each domain adapted stem questions for each layer of a hierarchical taxonomy of the present principles, the content information associated with the generated computational representations, such as temporal information, can be used to determine a relationship between content of at least one of different content domains and content of different layers of the hierarchical taxonomy of the present principles.

In the embodiment of FIG. 4, the computational module 120 can further generate question answer pairs 412, in one embodiment, of the domain adapted questions specific to each layer and associated content of the content domain related to a relative domain adapted stem questions, which for example is represented by/contained in the respective computational representation. Alternatively or in addition, in some embodiments, the computational module 120 generates question answer pairs further using human input.

In accordance with the present principles, the process outlined in FIG. 4 can be repeated for other layers of a hierarchical taxonomy, such as the Bloom taxonomy, applied in a content comprehension system of the present principles, such as the content comprehension system 100 of FIG. 1. More specifically, in accordance with embodiments of the present principles, a layer of a hierarchical taxonomy is identified. As previously recited, each layer of the hierarchical taxonomy includes words (e.g., verbs) associated with the layer. The verbs are used to determine stem questions as described above with respect to FIG. 4. The stem questions are applied to the domain knowledge for the respective layer of the hierarchical taxonomy to determine domain adapted stem questions. As depicted in FIG. 4, question answer pairs are determined for each of the domain adapted questions specific to each layer and in addition, at least one computational representation is determined for each layer of the hierarchical taxonomy.

Figure 5:
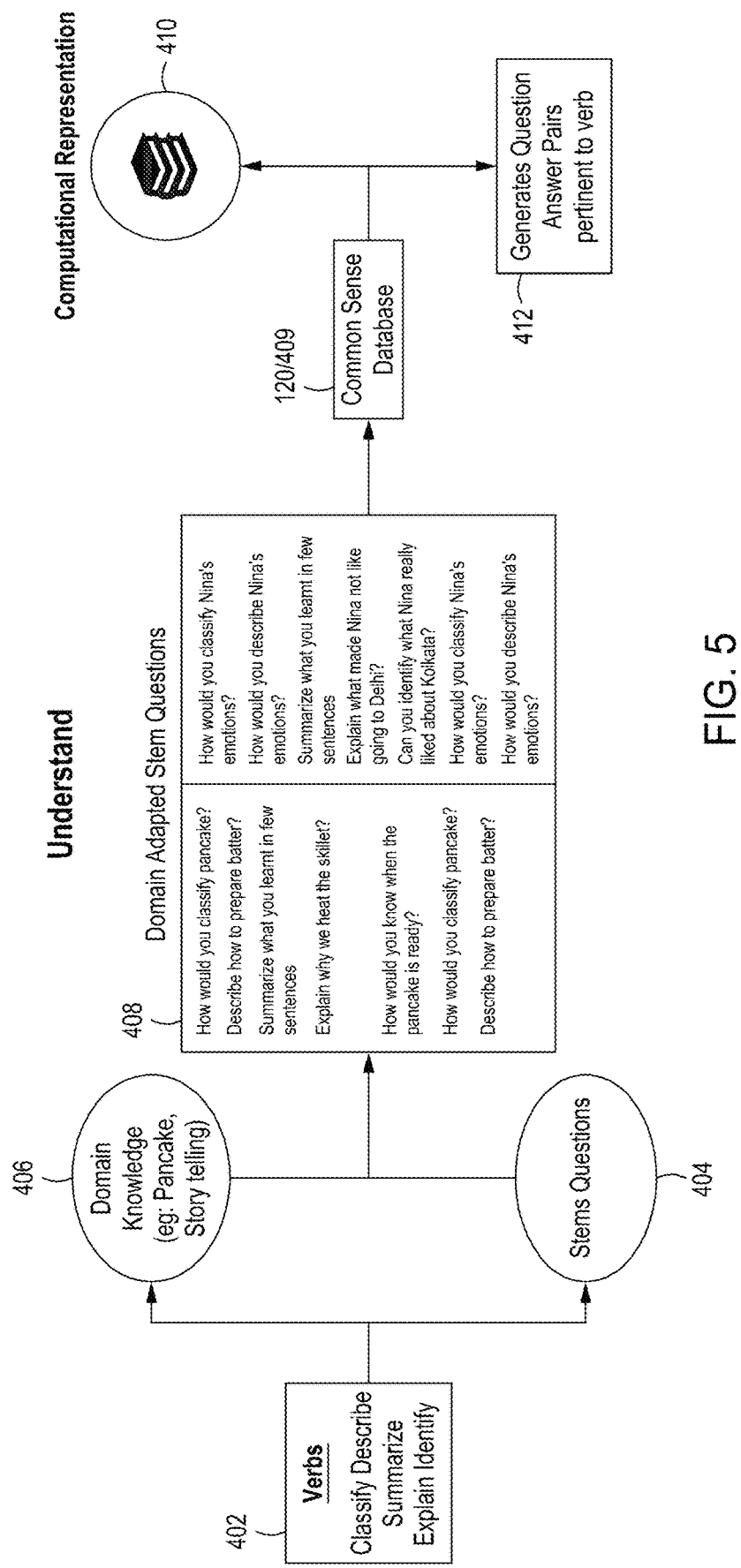
FIG. 5 depicts verbs associated with the second layer, the understand layer, of the hierarchical taxonomy of FIG. 2 in accordance with an embodiment of the preset principles.

For example, FIG. 5 depicts the verbs associated with the second layer, the understand layer, which in the embodiment of FIG. 5 include classify, describe, summarize, explain and identify and the determined, respective domain adapted stem questions for the pancake example include How would you classify pancake?, Describe how to prepare the batter?, Summarize what you learned in few sentences?, Explain why we heat the skillet?, How would you know when the pancake is ready?, How would you classify pancake?, and Describe how to prepare batter?.

In the embodiment of FIG. 5, the determined, respective domain adapted stem questions for the example regarding Nina's story include How would you classify Nina's emotions?, How would you describe Nina's emotions?, Summarize what you learned in a few sentences?, Explain what made Nina not like going to Delhi?, Can you identify what Nina really liked about Kolkata?, How would you classify Nina's emotions?, and How would you describe Nina's emotions?

In the embodiment of FIG. 5, a common sense database can be used to store information/data regarding content domains used for generating respective domain adapted stem questions and differences between a specific content domain and other, different content domains. In some embodiments, the common sense database can comprise a reserved section(s) of the storage device 180. Alternatively or in addition, the common sense database can comprise a separate storage device (not shown).

As further depicted in FIG. 5, information/data regarding the determined domain adapted stem questions and information regarding the content and the content domain related to each of the domain adapted stem questions, for example stored in the common sense database, is used to generate a computational representation.

In the embodiment of FIG. 5, the computational module 120 further generates question answer pairs, in one embodiment, of the domain adapted questions specific to each layer and associated content of the content domain related to a relative domain adapted stem questions, which for example is represented by/contained in the respective computational representation. Alternatively or in addition, in some embodiments, the computational module 120 generates question answer pairs further using human input.

FIGS. 6, 7, 8, and 9 depict the verbs and respective domain adapted questions associated with the remaining layers of the hierarchical taxonomy of FIG. 2 and specifically, the apply layer 206, the analyze layer 208, the evaluate layer 210, and the create layer 212. As depicted in FIGS. 6, 7, 8, and 9, for each layer, the computational module 120 generates question answer pairs for each of the domain adapted questions and further generates a computational representation for each layer as described above.

Figure 6:
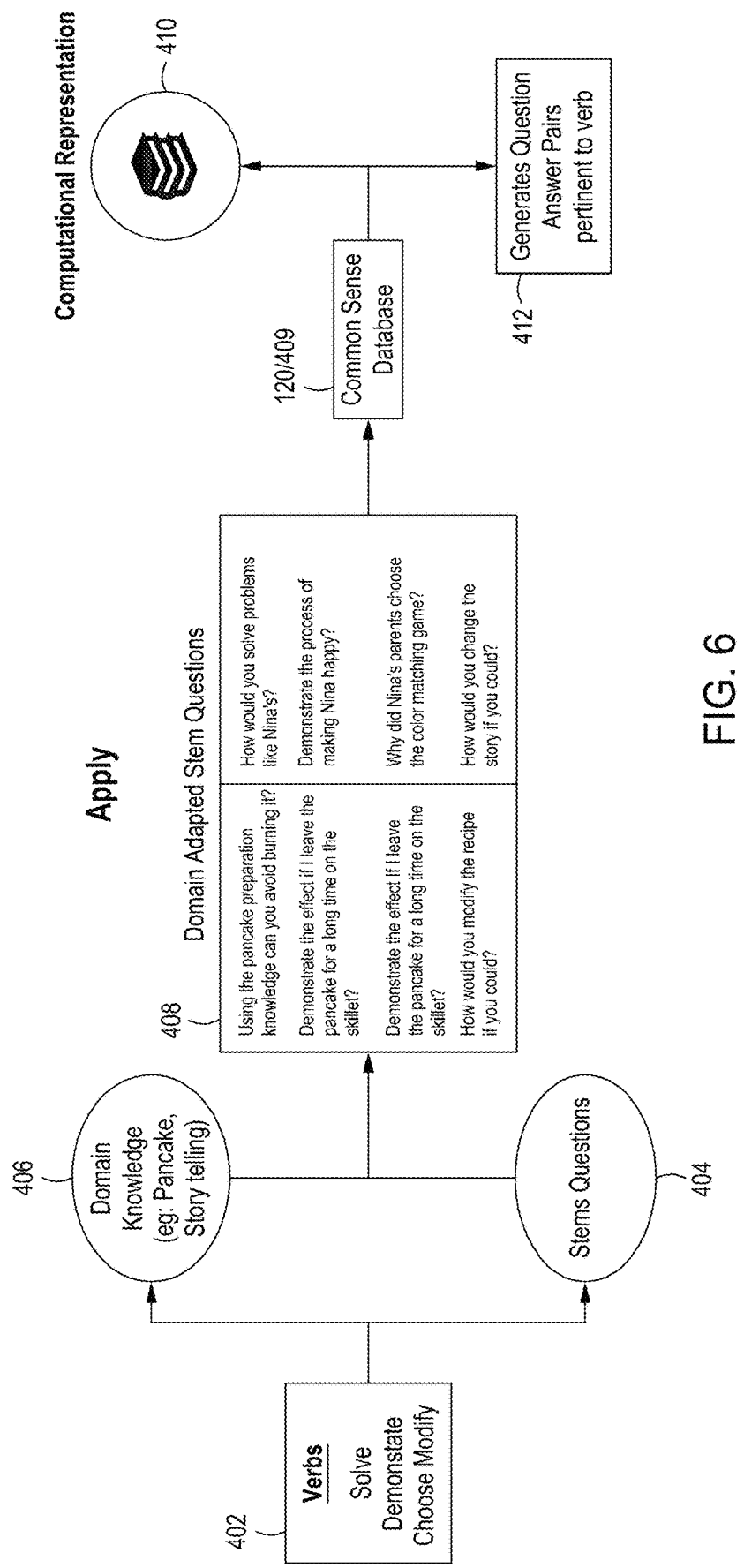
FIG. 6 depicts the verbs associated with the third layer, the apply layer, of the hierarchical taxonomy of FIG. 2, in accordance with an embodiment of the preset principles.

For example, FIG. 6 depicts the verbs associated with the third layer of the hierarchical taxonomy of FIG. 2, the apply layer, which in the embodiment of FIG. 6 include solve, demonstrate, choose, modify and the determined, respective domain adapted stem questions for the pancake example include Using the pancake preparation knowledge, can you avoid burning it?, Demonstrate the effect if I leave the pancake for a long time on the skillet?, Why did we choose sugar for Pancake and not salt?, and How would you modify the recipe if you could?.

In the embodiment of FIG. 6, the determined, respective domain adapted stem questions for the example regarding Nina's story include How would you solve problems like Nina's?, Demonstrate the process of making Nina happy?, Why did Nina's parents choose the color matching game?, and How would you change the story if you could?

As further depicted in FIG. 6, the computational module 120 of the content comprehension system 100 of FIG. 1 uses the determined domain adapted questions to generate a computational representation as described above. That is, in the embodiment of FIG. 6, a common sense database can be used to store information/data regarding content domains used for generating respective domain adapted stem questions and differences between a specific content domain and other, different content domains. In some embodiments, the common sense database can comprise a reserved section(s) of the storage device 180. Alternatively or in addition, the common sense database can comprise a separate storage device (not shown).

As further depicted in FIG. 6, information/data regarding the determined domain adapted stem questions and information regarding the content and the content domain related to each of the domain adapted stem questions, for example stored in the common sense database, is used to generate a computational representation.

In the embodiment of FIG. 6, the computational module 120 further generates question answer pairs, in one embodiment, of the domain adapted questions specific to each layer and associated content of the content domain related to a relative domain adapted stem questions, which for example is represented by/contained in the respective computational representation. Alternatively or in addition, in some embodiments, the computational module 120 generates question answer pairs further using human input.

Figure 7:
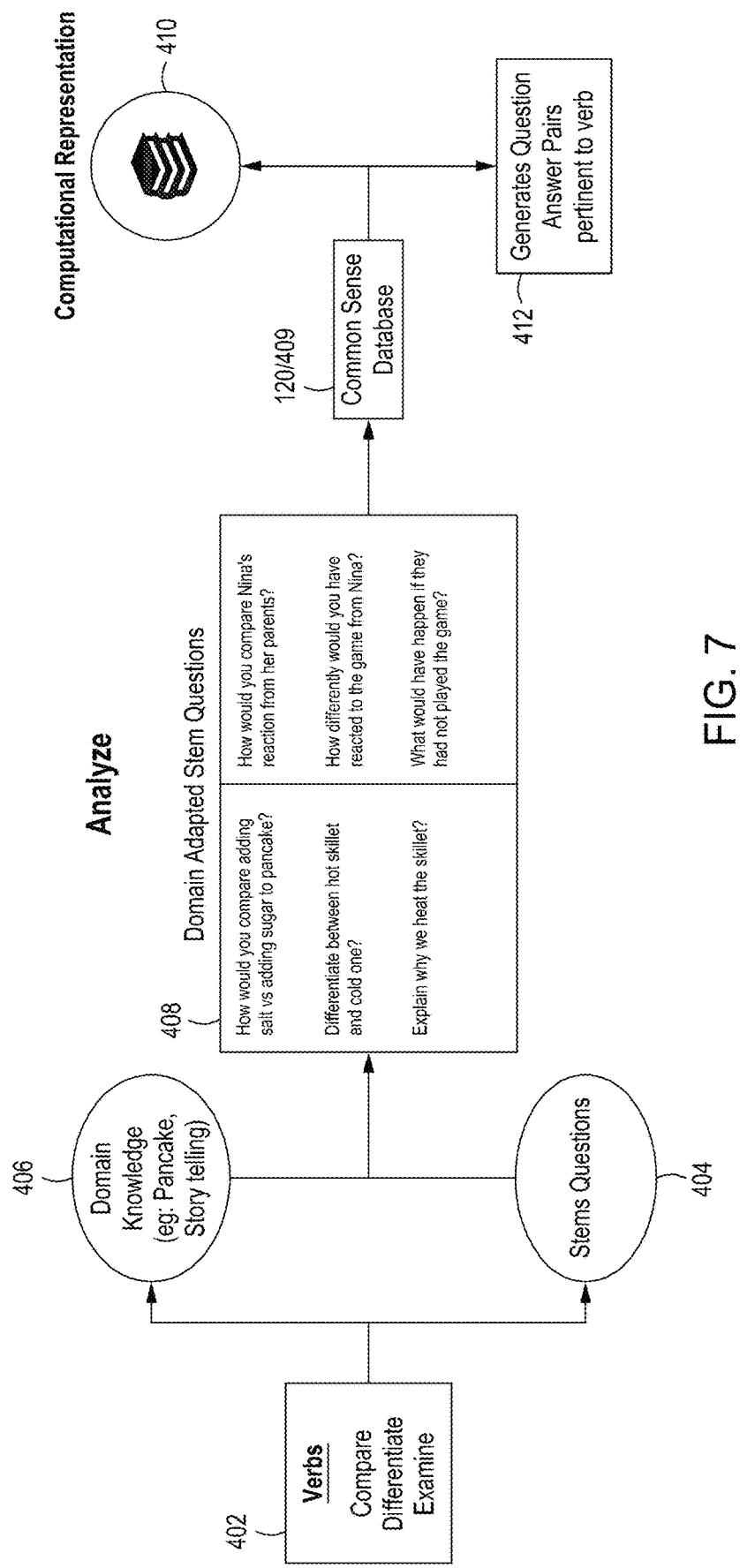
FIG. 7 depicts the verbs associated with the fourth layer, the analyze layer, of the hierarchical taxonomy of FIG. 2, in accordance with an embodiment of the preset principles.

FIG. 7 illustratively depicts the verbs associated with the fourth layer of the hierarchical taxonomy of FIG. 2, the analyze layer, which in the embodiment of FIG. 7 include compare, differentiate, and examine and the determined, respective domain adapted stem questions for the pancake example include How would you compare adding salt vs adding sugar to pancake?, Differentiate between hot skillet and cold one?, and Explain why we heat the skillet?.

In the embodiment of FIG. 7, the determined, respective domain adapted stem questions for the example regarding Nina's story include How would you compare Nina's reaction from her parents?, How differently would you have reacted to the game from Nina?, and What would have happened if they had not played the game?

As further depicted in FIG. 7, the computational module 120 of the content comprehension system 100 of FIG. 1 uses the determined domain adapted questions to generate a computational representation as described above. That is, in the embodiment of FIG. 7, a common sense database can be used to store information/data regarding content domains used for generating respective domain adapted stem questions and differences between a specific content domain and other, different content domains. In some embodiments, the common sense database can comprise a reserved section(s) of the storage device 180. Alternatively or in addition, the common sense database can comprise a separate storage device (not shown).

As further depicted in FIG. 7, information/data regarding the determined domain adapted stem questions and information regarding the content and the content domain related to each of the domain adapted stem questions, for example stored in the common sense database, is used to generate a computational representation.

In the embodiment of FIG. 7 the computational module 120 further generates question answer pairs, in one embodiment, of the domain adapted questions specific to each layer and associated content of the content domain related to a relative domain adapted stem questions, which for example is represented by/contained in the respective computational representation. Alternatively or in addition, in some embodiments, the computational module 120 generates question answer pairs further using human input.

Figure 8:
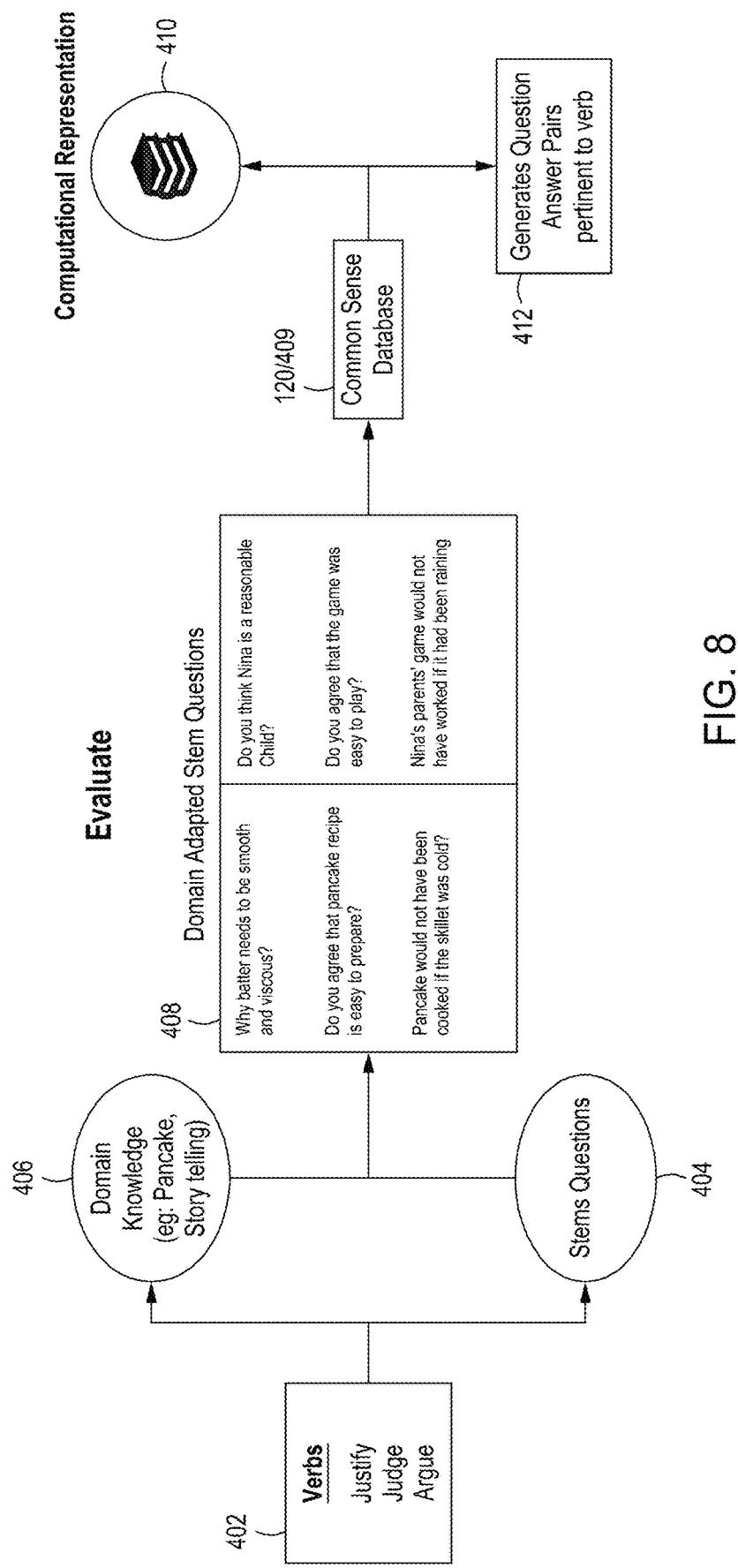
FIG. 8 depicts the verbs associated with the fifth layer, the evaluate layer, of the hierarchical taxonomy of FIG. 2, in accordance with an embodiment of the preset principles.

FIG. 8 illustratively depicts the verbs associated with the fifth layer of the hierarchical taxonomy of FIG. 2, the evaluate layer, which in the embodiment of FIG. 8 include justify, judge and argue and the determined, respective domain adapted stem questions for the pancake example include Why does the batter need to be smooth and viscous?, Do you agree that the pancake recipe is easy to prepare?, and The pancake would not have been cooked if the skillet was cold?.

In the embodiment of FIG. 8, the determined, respective domain adapted stem questions for the example regarding Nina's story include Do you think Nina is a reasonable child?, Do you agree that the game was easy to play?, and Nina's parents' game would not have worked if it had been raining.

As further depicted in FIG. 8, the computational module 120 of the content comprehension system 100 of FIG. 1 uses the determined domain adapted questions to generate a computational representation as described above. That is, in the embodiment of FIG. 8, a common sense database can be used to store information/data regarding content domains used for generating respective domain adapted stem questions and differences between a specific content domain and other, different content domains. In some embodiments, the common sense database can comprise a reserved section(s) of the storage device 180. Alternatively or in addition, the common sense database can comprise a separate storage device (not shown).

As further depicted in FIG. 8, information/data regarding the determined domain adapted stem questions and information regarding the content and the content domain related to each of the domain adapted stem questions, for example stored in the common sense database, is used to generate a computational representation.

In the embodiment of FIG. 8 the computational module 120 further generates question answer pairs, in one embodiment, of the domain adapted questions specific to each layer and associated content of the content domain related to a relative domain adapted stem questions, which for example is represented by/contained in the respective computational representation. Alternatively or in addition, in some embodiments, the computational module 120 generates question answer pairs further using human input.

Figure 9:
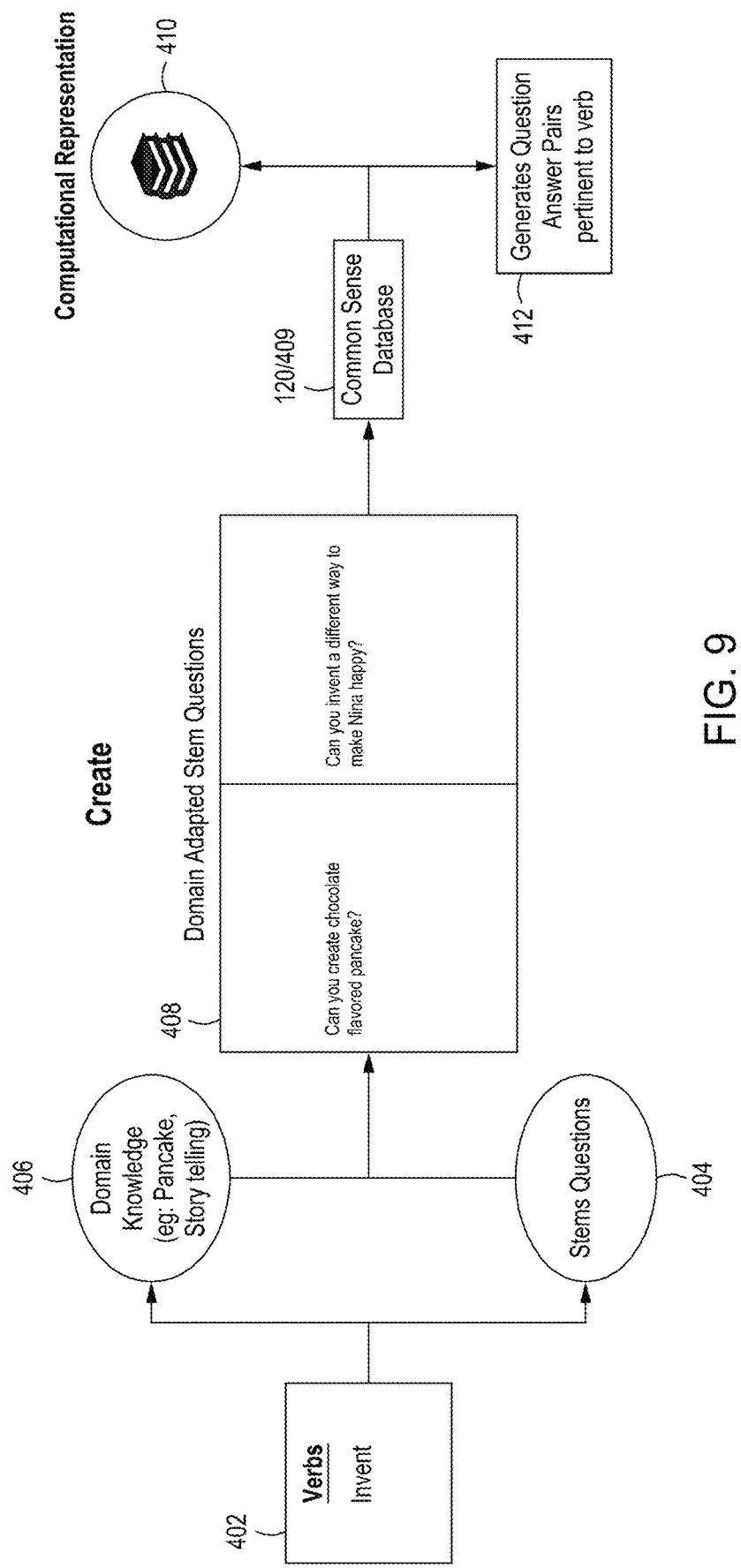
FIG. 9 depicts the verbs associated with the sixth layer, the create layer, of the hierarchical taxonomy of FIG. 2, in accordance with an embodiment of the preset principles.

FIG. 9 illustratively depicts the verbs associated with the sixth layer of the hierarchical taxonomy of FIG. 2, the create layer, which in the embodiment of FIG. 9 include invent and the determined, respective domain adapted stem questions for the pancake example include Can you create chocolate flavored pancake?

In the embodiment of FIG. 9, the determined, respective domain adapted stem questions for the example regarding Nina's story include Can you invent a different way to make Nina happy?.

As further depicted in FIG. 9, the computational module 120 of the content comprehension system 100 of FIG. 1 uses the determined domain adapted questions to generate a computational representation as described above. That is, in the embodiment of FIG. 9, a common sense database can be used to store information/data regarding content domains used for generating respective domain adapted stem questions and differences between a specific content domain and other, different content domains. In some embodiments, the common sense database can comprise a reserved section(s) of the storage device 180. Alternatively or in addition, the common sense database can comprise a separate storage device (not shown).

As further depicted in FIG. 9, information/data regarding the determined domain adapted stem questions and information regarding the content and the content domain related to each of the domain adapted stem questions, for example stored in the common sense database, is used to generate a computational representation.

In the embodiment of FIG. 9 the computational module 120 further generates question answer pairs, in one embodiment, of the domain adapted questions specific to each layer and associated content of the content domain related to a relative domain adapted stem questions, which for example is represented by/contained in the respective computational representation.

Alternatively or in addition, in some embodiments, the computational module 120 generates question answer pairs further using human input.

Figure 10:
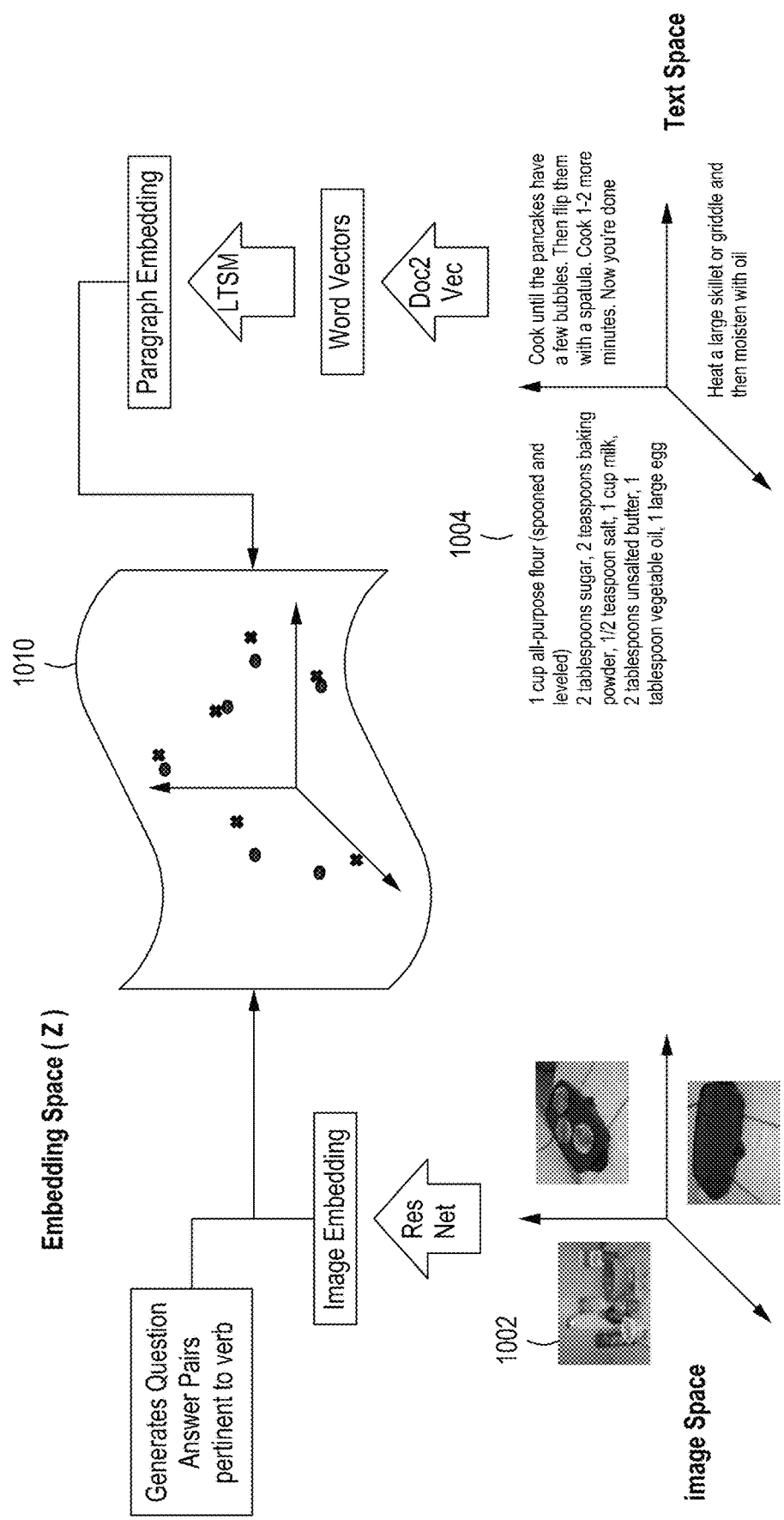
FIG. 10 depicts a graphical representation of embedding processes of embodiments of the present principles including machine learning processes of the present principles as applied to the first layer (remember layer) of the hierarchical taxonomy 200 of the embodiment of FIG. 2 in accordance with an embodiment of the preset principles.

FIG. 10 depicts a graphical representation of an embedding/training process in accordance with an embodiment of the present principles including machine learning processes of the present principles as applied with respect to a first layer (remember layer) 202 of the hierarchical taxonomy 200 of the embodiment of FIG. 2. In accordance with the present principles, generated question answer pairs are embedded in a common/joint embedding space 1010. That is, as depicted in FIG. 10, in accordance with the present principles, image content 1002, text content 1004 and audio content (not shown) of a content domain for which a respective domain adapted stem question was generated can be embedded in a common embedding space 1010 during training. The content to be embedded can include recipes for making pancakes from scratch, stories about Nina traveling on a train, recipes for making crepes, stories about Nina traveling in a car, and any other content a user may think is relevant to include in the embedding space. Illustratively in the embodiment of FIG. 10, images and text regarding how to make pancakes from scratch are being embedded into the common embedding space. In the embodiment of the content comprehension system 100 of FIG. 1, such embedding can be performed by the embedding module 130.

As depicted in FIG. 10, the embedding module embeds information/data related to the generated question answer pairs 1008 determined from each of the domain adapted stem questions and the related content in the content domain, from which the domain related stem questions were generated in each layer of the hierarchical taxonomy, and illustratively in FIG. 10, for the remember layer 202 of the hierarchical taxonomy depicted in FIG. 2. In some embodiments, image content is embedded into a joint/common embedding space 1010 by the embedding module 130 by, illustratively in FIG. 10, applying ResNet techniques, which include a pretrained Deep Learning model for image classification of the Convolutional Neural Network (CNN, or ConvNet), which includes a class of deep neural networks applied to analyzing visual imagery. That is, in some embodiments of the present principles the embedding module 130 determines a vector representation of the image content to embed the image content into the joint/common embedding space 1010. Although in the embodiment of FIG. 10 ResNet techniques are implemented to embed visual content, alternatively or in addition, other known visual content embedding techniques can be implemented in accordance with the present principles.

Illustratively, in the embodiment of FIG. 10, text/document content can be embedded in the common embedding space 1010 by applying Doc2Vec/Word2Vec techniques, which include algorithms which use a neural network model to learn word associations from a large corpus of text/documents. As the name implies, Doc2Vec/Word2Vec represents each distinct word/group of words with a particular list of numbers called a vector. That is, in some embodiments of the present principles the embedding module 130 determines a vector representation of the text/document content to embed the content into the joint/common embedding space 1010. Although in the embodiment of FIG. 10 Doc2Vec/Word2Vec techniques are implemented to embed text/documents, alternatively or in addition, other known text content embedding techniques can be implemented in accordance with the present principles. As further depicted in FIG. 10, in some embodiments, Long Short-Term Memory (LSTM) techniques can be applied to, for example, the text/phrase embedding. LSTM techniques include a type of recurrent neural network capable of learning order dependence.

In accordance with the present principles, the determined vector representations for the content are embedded in the common/joint embedding space along with a respective domain adapted stem question such that embedded vector representations for the domain adapted questions and embedded content vector representations that are related, are closer together in the common embedding space than unrelated vector representations embedded for the domain adapted questions and embedded content vector representations.

The common/joint embedding space 1010 is trained as described above for each respective question answer pair of each layer of the hierarchical taxonomy of the present principles. More specifically, the training of the common/joint embedding space 1010 of FIG. 10 with respect to the training of question answer pairs for the remember layer 202 of the hierarchical taxonomy of FIG. 2 is applied to each of the other layers of the hierarchical taxonomy 200 of the present principles. Because the common embedding space 1010 of the present principles comprises embedded question answer pairs for each of the layers of a hierarchical taxonomy of the present principles, a relationship between embedded question answer pairs of varying complexity can be determined.

Once the common/joint embedding space 1010 is trained as described above, a search question/content can be input to a content comprehension system of the present principles, such as the content comprehension system 100 of FIG. 1 to search for content. That is, in accordance with embodiments of the present principles, when a content comprehension system receives a question directed to a search for content in, for example the storage device 180, a vector representation of the received question is determined. The determined question vector representation is projected into the trained, common/joint embedding space. In the trained common/joint embedding space of the present principles, such as the trained, common/joint embedding space 1010 of FIG. 10, a distance function is implemented to determine a question answer pair vector representation embedded in the trained, common/joint embedding space closest to the projected determined question vector representation to determine content in, for example, the storage device 180 relevant to the received question. In some embodiments of the present principles, the distance function can include at least one of a cosine function, a Euclidean function, and/or a Lagrangian point 1, and an L1, function.

In accordance with the present principles, the training and embedding of the present principles, for example as described with respect to FIG. 10, can generate a model (depicted in FIG. 11) for each of the domain adapted questions in each layer of the hierarchical taxonomy. For example and with respect to the embodiment of FIG. 10, a content comprehension system of the present principles, such as the content comprehension system 100 of FIG. 1, can create a model (depicted in FIG. 11) associated with a domain adapted question, which requests a list of ingredients for making a pancake (e.g., what is a list of ingredients for making a pancake?) in a remember layer 202 of a hierarchical taxonomy of the present principles. In accordance with the present principles, a model can be determined for each domain adapted question for each of the layers of a hierarchical taxonomy.

At a higher level, the training and embedding of the present principles, for example as described with respect to FIG. 10, can generate a model for each domain of content in each layer of the hierarchical taxonomy. For example and with respect to the embodiment of FIG. 10, a content comprehension system of the present principles, such as the content comprehension system 100 of FIG. 1, can create a higher-level model for how to make a pancake from scratch for each layer of the hierarchical taxonomy (illustratively in FIG. 10 the remember layer 202), which in some embodiments would include embeddings associated with all respective domain adapted stem questions for each layer (e.g., the remember layer) of the hierarchical taxonomy.

In accordance with the present principles, the determined models can be implemented by a content comprehension system of the present principles, such as the content comprehension system 100 of FIG. 1, to more thoroughly comprehend content processed as described above and to more accurately retrieve stored, processed content for example from a storage device, such as the storage device 180 of the content comprehension system 100 of FIG. 1.

In accordance with the present principles, the models determined by a content comprehension system of the present principles, such as the content comprehension system 100 of FIG. 1, can be implemented to comprehend and retrieve data from a storage device, such as the storage device 180 of the content comprehension system 100 of FIG. 1, for content not directly related to a determined model. For example, FIG. 11 depicts a graphical representation of the adaptation of a model 1150 determined for a list of ingredients for making pancakes, as described above, to a list of ingredients for making crepes.

Figure 11:
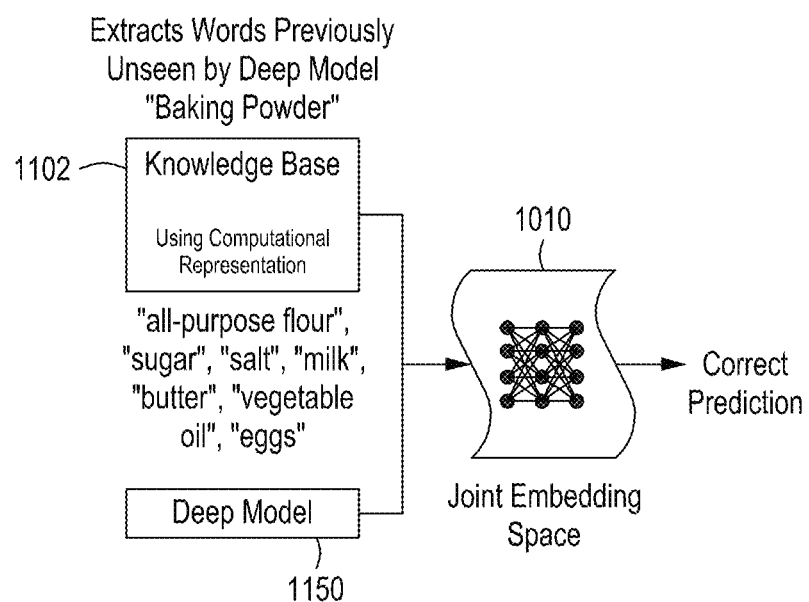
FIG. 11 depicts a graphical representation of the adaptation of a model determined for a list of ingredients for making pancakes to a list of ingredients for making crepes in accordance with an embodiment of the preset principles.

In the embodiment of FIG. 11, the optional adaptation module 140 of the content comprehension system 100 of FIG. 1 can compare content information 1102 of ingredients for making crepes previously received by the content comprehension system 100 of FIG. 1 and stored, for example, in the storage device/knowledge base or represented by a computational representation to information in the previously determined model 1150 for ingredients for making pancakes to determine a content difference between ingredients needed for making pancakes and ingredients needed for making crepes. A resultant vector representation of the content differences between ingredients needed for making pancakes and ingredients needed for making crepes and the previously determined model 1150 for ingredients for making pancakes is determined and can be projected into a joint embedding space of the present principles, such as the joint embedding space 1010 of FIG. 10, by, for example the embedding module 130. The result of the projected resultant vector of the content differences between ingredients needed for making pancakes and ingredients needed for making crepes and the previously determined model 1150 for ingredients for making pancakes represents a vector location in the joint embedding space 1010 that includes content that represents ingredients for making crepes. In some embodiments of the present principles, ingredients for making crepes (the changed content domain) can be determined from a computational representation previously generated for the ingredients for making crepes by a process of the present principles previously described above for generating computational representations.

The above described procedure of FIG. 11 for the adaptation of a model determined by the content comprehension system 100 of FIG. 1 to content not directly related to the determined model can be implemented with any model determined by a content comprehension system of the present principles, such as the content comprehension system 100 of FIG. 1 and for any layer of a hierarchical taxonomy of the present principles.

Figure 12:
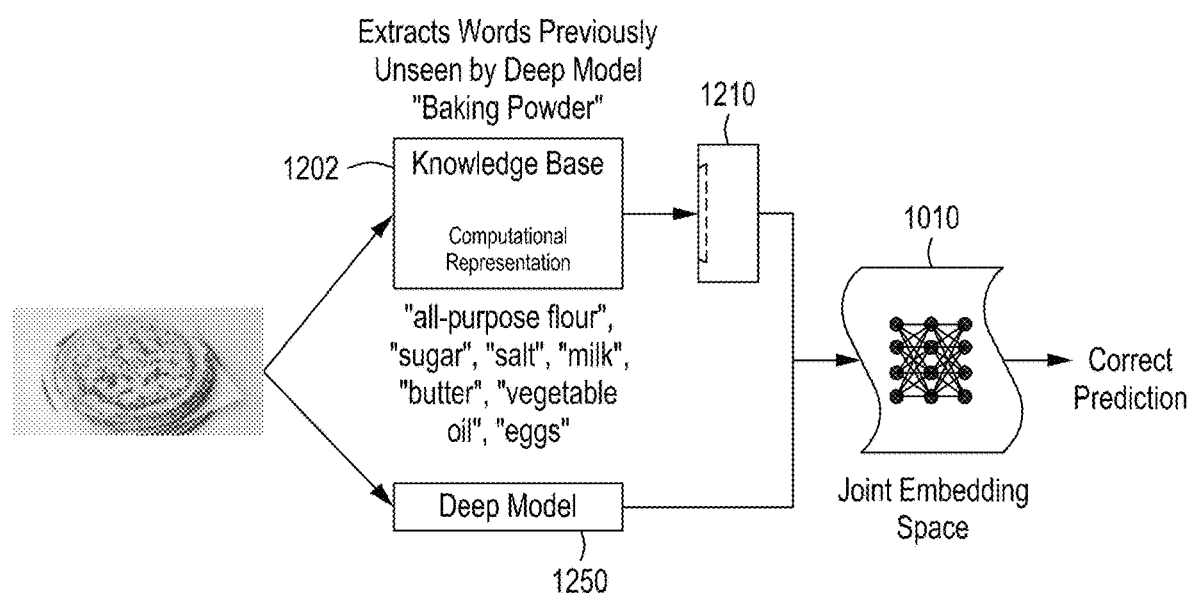
FIG. 12 depicts a graphical representation of an adaptation of a model determined for a list of ingredients for making pancakes to a list of ingredients for making crepes including the further application of rules in accordance with an embodiment of the preset principles.

In an alternate embodiment of the present principles, the procedure described in FIG. 11 can be adapted to further include the application of logical rules for the adaptation of a content model determined by a content comprehension system of the present principles to content not directly related to the content model. For example, FIG. 12 depicts a graphical representation of an adaptation of a model determined for a list of ingredients for making pancakes to a list of ingredients for making crepes. In the embodiment of FIG. 12, the optional adaptation module 140 of the content comprehension system 100 of FIG. 1 compares content information 1202 of ingredients for making crepes previously received by the content comprehension system 100 of FIG. 1 and stored, for example, in the storage device 180 to information in the previously determined model 1250 for ingredients for making pancakes to determine a content difference between ingredients needed for making pancakes and ingredients needed for making crepes. In the embodiment of FIG. 12, the optional adaptation module 140 of the content comprehension system 100 of FIG. 1 can apply rules 1210 to previously received content regarding ingredients for making crepes to limit the content that is compared to the previously determined model 1250 for ingredients for making pancakes for determining differences, which ultimately limits and more narrowly defines a determined vector that is determined for the content differences between ingredients needed for making pancakes and ingredients needed for making crepes and the previously determined model 1250 for ingredients for making pancakes, which vector is projected into the joint embedding space of the present principles, such as the joint embedding space 1010 of FIG. 10.

More specifically, in the embodiment of FIG. 12, a rule 1210 can be applied by the adaptation module 140 to the previously received content defining ingredients for making crepes that indicates that ingredients for making crepes must include salt. As such, only previously received content for ingredients for making crepes that include salt will be considered when determining differences between ingredients needed for making pancakes and ingredients needed for making crepes and the previously determined model 1260 for ingredients for making pancakes. A resultant vector for a combination of the determined differences and the previously determined model 1250 for ingredients for making pancakes is determined and can be projected into a joint embedding space, such as the joint embedding space 1010 depicted in the embodiment of FIG. 10, by, for example, the embedding module 130. The result of the projected resultant vector of the content differences between ingredients needed for making pancakes and ingredients needed for making crepes and the previously determined model 1250 for ingredients for making pancakes is a vector in the joint embedding space 1010 that represents content related to ingredients for making crepes, which is limited and constrained by the applied rules, which results in a more accurate determination of the resultant vector and subsequently determined ingredients for making crepes.

Figure 13:
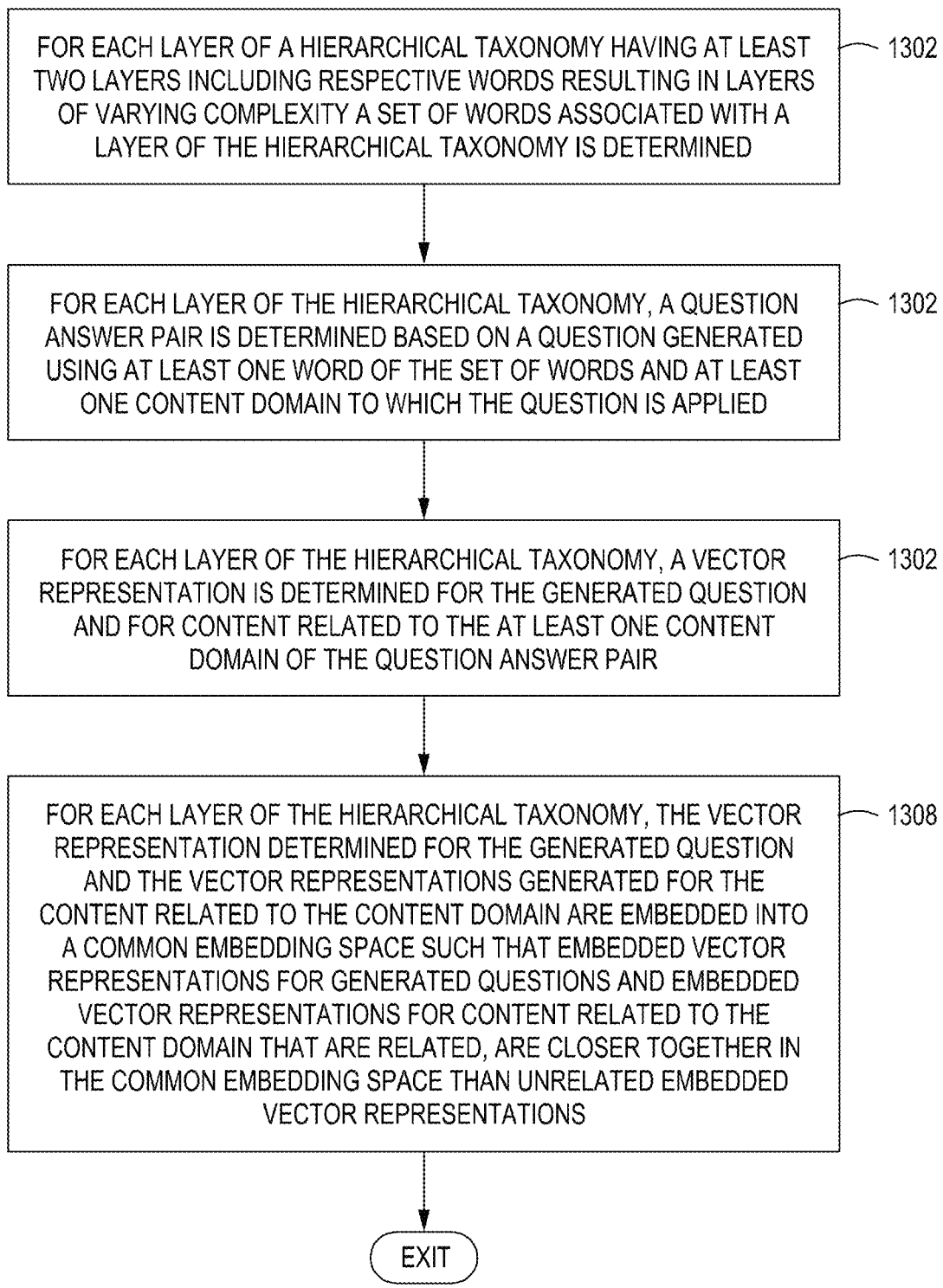
FIG. 13 depicts a flow diagram of a method for training an embedding space for content comprehension and response in accordance with an embodiment of the present principles.

FIG. 13 depicts a flow diagram of a method 1300 for training an embedding space for content comprehension and response in accordance with an embodiment of the present principles. The method 1300 can begin at 1302 during which for each layer of a hierarchical taxonomy having at least two layers including respective words resulting in layers of varying complexity a set of words associated with a layer of the hierarchical taxonomy is determined. The method 1300 can proceed to 1304.

At 1304, for each layer of the hierarchical taxonomy, a question answer pair is determined based on a question generated using at least one word of the set of words and at least one content domain to which the question is applied. The method 1300 can proceed to 1306.

At 1306, a vector representation is determined for the generated question and for content related to the at least one content domain of the question answer pair. The method 1300 proceeds to 1308.

At 1308, the vector representation determined for the generated question and the vector representations generated for the content related to the content domain are embedded into a common embedding space such that embedded vector representations for generated questions and embedded vector representations for content related to the content domain that are related, are closer together in the common embedding space than unrelated embedded vector representations. The method 1300 can be exited.

In some embodiments in accordance with the present principles, the common embedding space of, for example, the method 1300, comprises embedded question answer pairs for each of the at least two layers of the hierarchical taxonomy, such that a relationship between embedded question answer pairs of varying complexity can be determined The method 1300 described above represents an embodiment in which a human provides question answer pairs to a content comprehension system of the present principles. In embodiments in which a human does not provide question answer pairs, the method 1300 could further include determining at least one stem question for a word of the set of words and determining at least one respective domain adapted question for at least one stem question based on the at least one content domain.

In some embodiments, the method 1300 of FIG. 13 can further include determining a model from the embedded vectors related to each of the question answer pairs.

Figure 14:
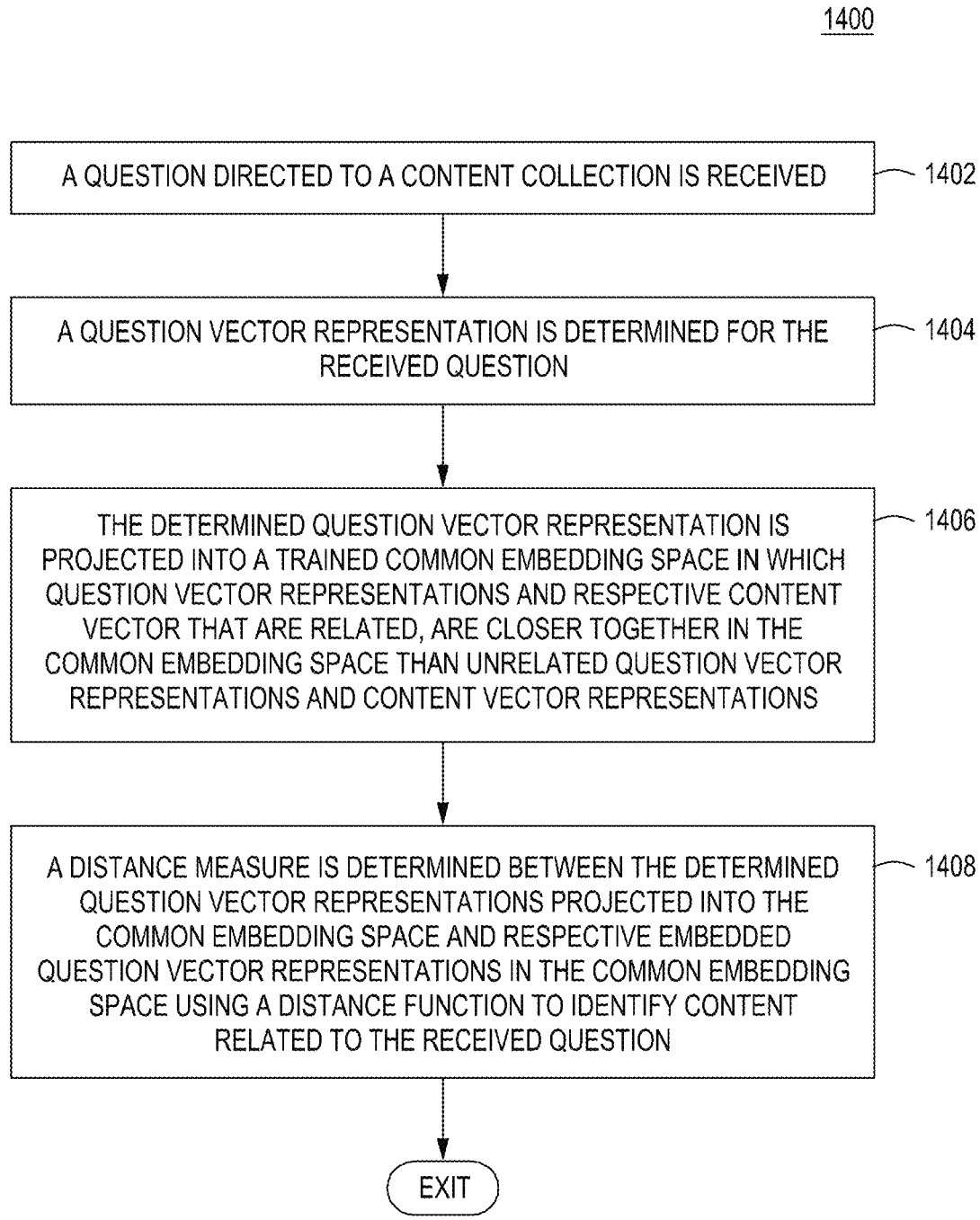
FIG. 14 depicts a flow diagram of a method for content comprehension and response using a common embedding space in accordance with an embodiment of the present principles.

FIG. 14 depicts a flow diagram of a method 1400 for content comprehension and response of a content collection using a common embedding space in accordance with an embodiment of the present principles. The method 1400 begins at 1402 during which a question directed to the content collection is received. The method 1400 can proceed to 1404.

At 1404, a question vector representation is determined for the received question. The method 1400 can proceed to 1406.

At 1406, the determined question vector representation is projected into a trained common embedding space in which question vector representations and respective content vector that are related, are closer together in the common embedding space than unrelated question vector representations and content vector representations. The method 1400 can proceed to 1408.

At 1408, a distance measure is determined between the determined question vector representations projected into the common embedding space and respective embedded question vector representations in the common embedding space using a distance function to identify content related to the received question. The method 1400 can be exited.

In the method 1400 of FIG. 14, the common embedding space can be determined according to the method 1300 of FIG. 13.

As depicted in FIG. 1, embodiments of a content comprehension and response system of the present principles, such as the content comprehension and response system 100 of FIG. 1, can be implemented in a computing device 1500 in accordance with the present principles. That is, in some embodiments, multimodal content, questions regarding the multimodal content, data and the like can be communicated to components of the content comprehension and response system 100 of FIG. 1 using the computing device 1500 via, for example, any input/output means associated with the computing device 1500. Data associated with a content comprehension and response system in accordance with the present principles can be presented to a user using an output device of the computing device 1500, such as a display, a printer or any other form of output device.

Figure 15:
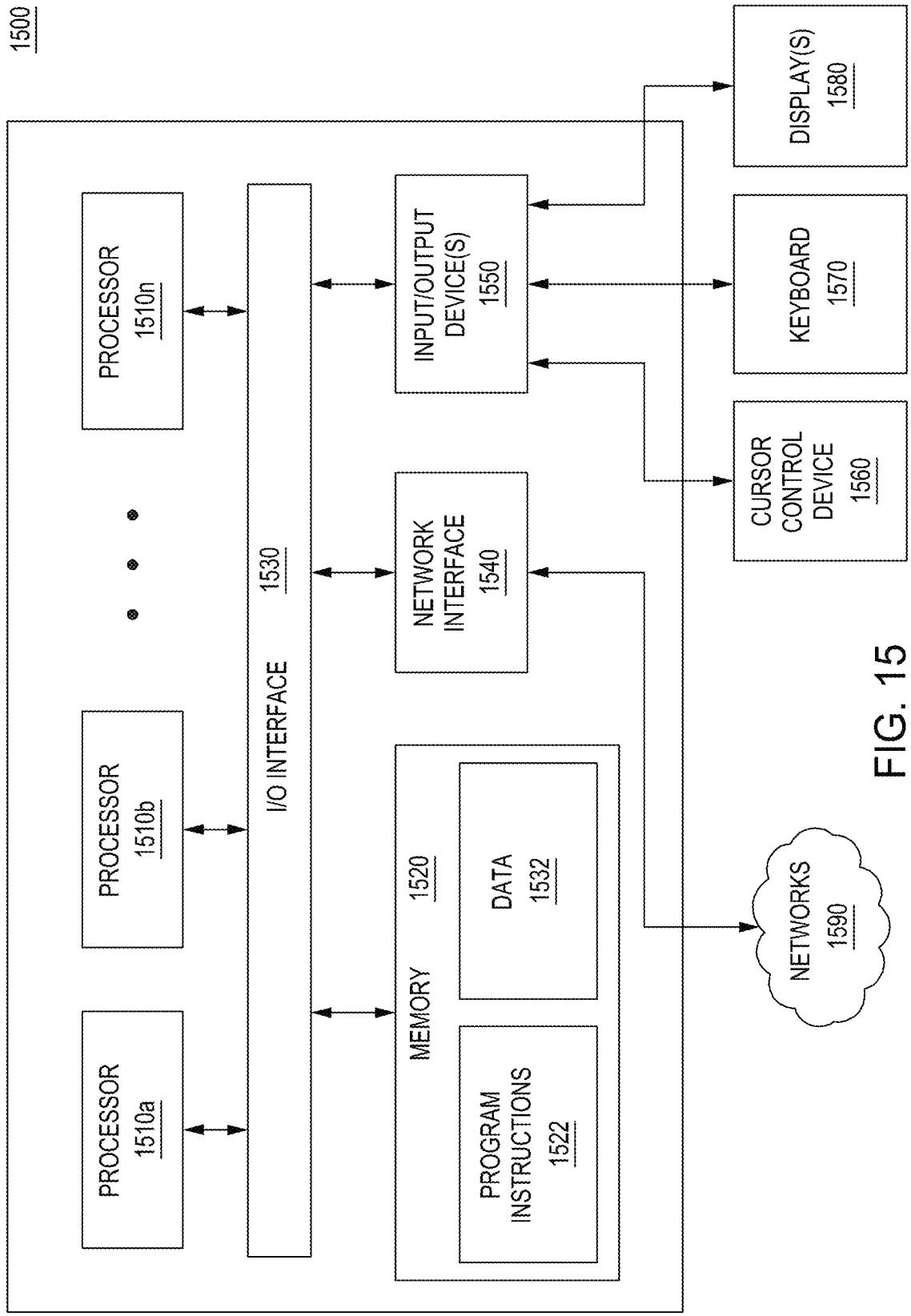
FIG. 15 depicts a high-level block diagram of a computing device suitable for use with embodiments of a content comprehension and response system in accordance with the present principles.

For example, FIG. 15 depicts a high-level block diagram of a computing device 1500 suitable for use with embodiments of a content comprehension and response system in accordance with the present principles such as the content comprehension and response system 100 of FIG. 1. In some embodiments, the computing device 1500 can be configured to implement methods of the present principles as processor-executable executable program instructions 1522 (e.g., program instructions executable by processor(s) 910) in various embodiments.

In the embodiment of FIG. 15, the computing device 1500 includes one or more processors 1510a-1510n coupled to a system memory 1520 via an input/output (I/O) interface 1530. The computing device 1500 further includes a network interface 1540 coupled to I/O interface 1530, and one or more input/output devices 1550, such as cursor control device 1560, keyboard 1570, and display(s) 1580. In various embodiments, a user interface can be generated and displayed on display 1580. In some cases, it is contemplated that embodiments can be implemented using a single instance of computing device 1500, while in other embodiments multiple such systems, or multiple nodes making up the computing device 1500, can be configured to host different portions or instances of various embodiments. For example, in one embodiment some elements can be implemented via one or more nodes of the computing device 1500 that are distinct from those nodes implementing other elements. In another example, multiple nodes may implement the computing device 1500 in a distributed manner.

In different embodiments, the computing device 1500 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1500 can be a uniprocessor system including one processor 1510, or a multiprocessor system including several processors 1510 (e.g., two, four, eight, or another suitable number). Processors 1510 can be any suitable processor capable of executing instructions. For example, in various embodiments processors 1510 may be general-purpose or embedded processors implementing any of a variety of instruction set architectures (ISAs). In multiprocessor systems, each of processors 1510 may commonly, but not necessarily, implement the same ISA.

System memory 1520 can be configured to store program instructions 1522 and/or data 1532 accessible by processor 1510. In various embodiments, system memory 1520 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1520. In other embodiments, program instructions and/or data can be received, sent or stored upon different types of computer-accessible media or on similar media separate from system memory 620 or computing device 1500.

In one embodiment, I/O interface 1530 can be configured to coordinate I/O traffic between processor 1510, system memory 1520, and any peripheral devices in the device, including network interface 1540 or other peripheral interfaces, such as input/output devices 1550. In some embodiments, I/O interface 1530 can perform any necessary protocol, timing or other data transformations to convert data signals from one component (e.g., system memory 1520) into a format suitable for use by another component (e.g., processor 1510). In some embodiments, I/O interface 1530 can include support for devices attached through various types of peripheral buses, such as a variant of the Peripheral Component Interconnect (PCI) bus standard or the Universal Serial Bus (USB) standard, for example. In some embodiments, the function of I/O interface 1530 can be split into two or more separate components, such as a north bridge and a south bridge, for example. Also, in some embodiments some or all of the functionality of I/O interface 1530, such as an interface to system memory 1520, can be incorporated directly into processor 1510.

Network interface 1540 can be configured to allow data to be exchanged between the computing device 1500 and other devices attached to a network (e.g., network 1590), such as one or more external systems or between nodes of the computing device 1500. In various embodiments, network 1590 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1550 can, in some embodiments, include one or more display terminals, keyboards, keypads, touchpads, scanning devices, voice or optical recognition devices, or any other devices suitable for entering or accessing data by one or more computer systems. Multiple input/output devices 1550 can be present in computer system or can be distributed on various nodes of the computing device 1500. In some embodiments, similar input/output devices can be separate from the computing device 1500 and can interact with one or more nodes of the computing device 1500 through a wired or wireless connection, such as over network interface 1540.

Those skilled in the art will appreciate that the computing device 1500 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 1500 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 1500 can communicate with other computing devices based on various computer communication protocols such a Wi-Fi, Bluetooth™ (and/or other standards for exchanging data over short distances includes protocols using short-wavelength radio transmissions), USB, Ethernet, cellular, an ultrasonic local area communication protocol, etc. The computing device 600 can further include a web browser.

Although the computing device 1500 is depicted as a general purpose computer, the computing device 1500 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 16:
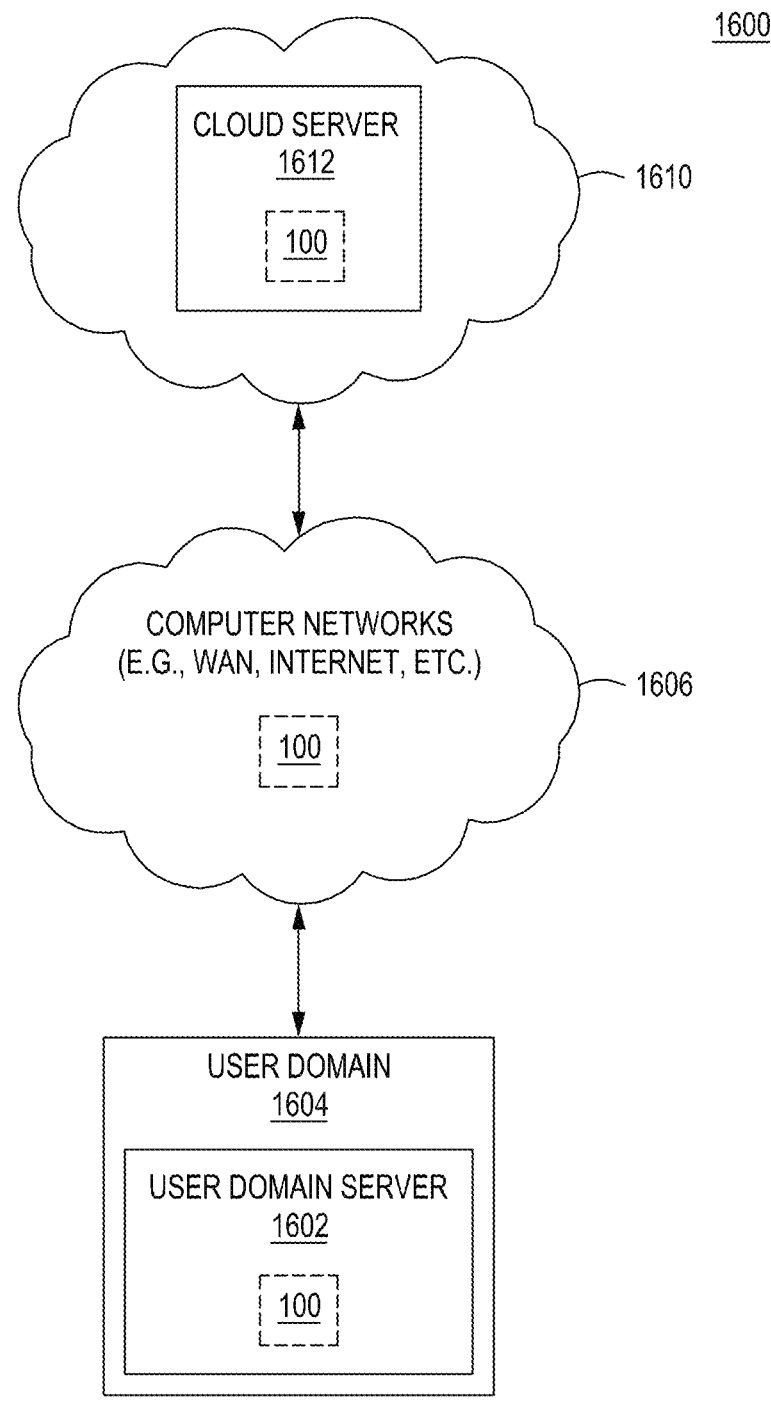
FIG. 16 depicts a high-level block diagram of a network in which embodiments of a content comprehension and response system in accordance with the present principles, can be applied.

FIG. 16 depicts a high-level block diagram of a network in which embodiments of a content comprehension and response system in accordance with the present principles, such as the content comprehension and response system 100 of FIG. 1, can be applied. The network environment 1600 of FIG. 16 illustratively comprises a user domain 1602 including a user domain server/computing device 1604. The network environment 1600 of FIG. 16 further comprises computer networks 1606, and a cloud environment 1610 including a cloud server/computing device 1612.

In the network environment 1600 of FIG. 16, a system for content comprehension and response in accordance with the present principles, such as the system 100 of FIG. 1, can be included in at least one of the user domain server/computing device 1604, the computer networks 1606, and the cloud server/computing device 1612. That is, in some embodiments, a user can use a local server/computing device (e.g., the user domain server/computing device 1604) to provide content comprehension and response in accordance with the present principles.

In some embodiments, a user can implement a system for content comprehension and response in the computer networks 1606 to provide content comprehension and response in accordance with the present principles. Alternatively or in addition, in some embodiments, a user can implement a system for content comprehension and response in the cloud server/computing device 1612 of the cloud environment 1610 to provide content comprehension and response in accordance with the present principles. For example, in some embodiments it can be advantageous to perform processing functions of the present principles in the cloud environment 1610 to take advantage of the processing capabilities and storage capabilities of the cloud environment 1610. In some embodiments in accordance with the present principles, a system for providing content comprehension and response can be located in a single and/or multiple locations/servers/computers to perform all or portions of the herein described functionalities of a system in accordance with the present principles. For example, in some embodiments some components of a content comprehension and response system of the present principles can be located in one or more than one of the a user domain 1602, the computer network environment 1606, and the cloud environment 1610 while other components of the present principles can be located in at least one of the user domain 1602, the computer network environment 1606, and the cloud environment 1610 for providing the functions described above either locally or remotely.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 1500 can be transmitted to the computing device 1500 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for training an embedding space for content comprehension and response, comprising:
for each layer of a hierarchical taxonomy having at least two layers including respective words resulting in layers of varying complexity:
determining a set of words associated with a layer of the hierarchical taxonomy;
determining a question answer pair based on a question generated using at least one word of the set of words and at least one content domain to which the question is applied;
determining a vector representation for the generated question answer pair and for content related to the at least one content domain of the question answer pair; and
embedding the vector representation determined for the generated question answer pair and the vector representations generated for the content related to the content domain into a common embedding space such that embedded vector representations for generated question answer pairs and embedded vector representations for content related to the content domain that are related, are closer together in the common embedding space than unrelated embedded vector representations;
wherein the common embedding space comprises embedded question answer pairs for each of the at least two layers of the hierarchical taxonomy, such that a relationship between embedded question answer pairs of varying complexity can be determined.

2. The method of claim 1, wherein generating the question answer pair further comprises:
determining at least one stem question for a word of the set of words; and
determining at least one respective domain adapted question for at least one stem question based on the at least one content domain;
wherein the at least one respective domain adapted question is used to generate the question answer pair.

3. The method of claim 1, wherein a user provides the question answer pair.

4. The method of claim 1, wherein each word of the set of words comprises a verb.

5. The method of claim 1, further comprising determining a content model for at least one of, each of the determined questions answer pairs in each of the at least two layers of the hierarchical taxonomy or for all of the questions answer pairs determined for the hierarchical taxonomy, collectively.

6. The method of claim 4, further comprising adapting a determined content model to apply to content not directly represented by the content model.

7. The method of claim 5, further comprising applying rules to constrain the adaptation of the determined content model.

8. The method of claim 1, further comprising generating a computational representation of content related to at least once content domain for each of the at least two layers of the hierarchical taxonomy.

9. The method of claim 8, wherein generated computational representations are used to determine a relationship between content of at least one of different content domains and content of different layers of the hierarchical taxonomy.

10. A method for content comprehension and response of content, comprising:
receiving a question directed to the content;
determining a question vector representation of the received question;
projecting the determined question vector representation into a trained common embedding space in which question vector representations and respective content vector representations that are related, are closer together in the common embedding space than unrelated question vector representations and content vector representations;
determining a distance measure between the determined question vector representations projected into the common embedding space and respective embedded question answer pair vector representations in the common embedding space using a distance function to identify content related to the received question;
wherein the common embedding space is trained by:
selecting a hierarchical taxonomy having at least two layers including respective words resulting in layers of varying complexity; and
for each layer of the hierarchical taxonomy:
determining a set of words associated with a layer of the hierarchical taxonomy;

determining a question answer pair based on a question generated using at least one word of the set of words and at least one content domain to which the question is applied;

determining a vector representation for the generated question answer pair and for content related to the at least one content domain of the question answer pair; and embedding the vector representation determined for the generated question answer pair and the vector representations generated for the content related to the content domain into a common embedding space such that embedded vector representations for generated question answer pair and embedded vector representations for content related to the content domain that are related, are closer together in the common embedding space than unrelated embedded vector representations;

wherein the common embedding space comprises embedded question answer pairs for each of the at least two layers of the hierarchical taxonomy, such that a relationship between embedded question answer pairs of varying complexity can be determined.

11. The method of claim 10, wherein the received question is related to a search for content in the content collection.

12. The method of claim 10, wherein the distance function comprises at least one of a cosine function, a Euclidean function, and/or a Lagrangian point 1, and an L1, function.

13. The method of claim 10, further comprising generating a computational representation of content related to at least once content domain for each of the at least two layers of the hierarchical taxonomy and using the generated computational representations to determine a relationship between content of at least one of different content domains and content of different layers of the hierarchical taxonomy.

14. A non-transitory machine-readable medium having stored thereon at least one program, the at least one program including instructions which, when executed by a processor, cause the processor to perform a method in a processor based system for content comprehension and response of a content collection, comprising:

for a received question directed to the content collection;
determining a question vector representation of the received question;
projecting the determined question vector representation into a trained common embedding space in which question vector representations and respective content vector that are related, are closer together in the common embedding space than unrelated question vector representations and content vector representations;
determining a distance measure between the determined question vector representations projected into the common embedding space and respective embedded question vector representations in the common embedding space using a distance function to identify content related to the received question;
wherein the common embedding space is trained by:
for each layer of a hierarchical taxonomy having at least two layers including respective words resulting in layers of varying complexity:
determining a set of words associated with a layer of the hierarchical taxonomy;

determining a question answer pair based on a question generated using at least one word of the set of words and at least one content domain to which the question is applied;

determining a vector representation for the generated question and for content related to the at least one content domain of the question answer pair; and embedding the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations;

wherein the common embedding space comprises embedded question answer pairs for each of the at least two layers of the hierarchical taxonomy, such that a relationship between embedded question answer pairs of varying complexity can be determined.

15. The non-transitory machine-readable medium of claim 14, wherein the method further comprises determining a content model for at least one of each of the determined questions answer pairs in each of the at least two layers of the hierarchical taxonomy or for all of the questions answer pairs determined for the hierarchical taxonomy, collectively.

16. The non-transitory machine-readable medium of claim 15, further comprising adapting a determined content model to apply to multimodal content not directly related to multimodal content represented by the content model.

17. The non-transitory machine-readable medium of claim 16, further comprising applying rules to constrain the adaptation of the determined content model.

18. A system for training an embedding space for content comprehension and response, comprising:
a processor; and
a memory coupled to the processor, the memory having stored therein at least one of programs or instructions executable by the processor to configure the system to:
for each layer of a hierarchical taxonomy having at least two layers including respective words resulting in layers of varying complexity:
determine a set of words associated with a layer of the hierarchical taxonomy;
determine a question answer pair based on a question generated using at least one word of the set of words and at least one content domain to which the question is applied;
determine a vector representation for the generated question and for content related to the at least one content domain of the question answer pair; and
embed the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations;
wherein the common embedding space comprises embedded question answer pairs for each of the at least two layers of the hierarchical taxonomy, such that a relationship between embedded question answer pairs of varying complexity can be determined.

19. The system of claim 18, wherein generating the question comprises:
- determining at least one stem question for a word of the set of words; and
- determining at least one respective domain adapted question for at least one stem question based on the at least one content domain.

20. A system for content comprehension and response of a content collection, comprising:
- a processor; and
- a memory coupled to the processor, the memory having stored therein at least one of programs or instructions executable by the processor to configure the system to:
- receiving a question directed to the content collection;
- determine a question vector representation of the received question;
- project the determined question vector representation into a trained common embedding space in which question vector representations and respective content vector that are related, are closer together in the common embedding space than unrelated question vector representations and content vector representations;
- determine a distance measure between the determined question vector representations projected into the common embedding space and respective embedded question vector representations in the common embedding space using a distance function to identify content related to the received question;

wherein the common embedding space is trained by:
for each layer of a hierarchical taxonomy having at least two layers including respective words resulting in layers of varying complexity:
- determining a set of words associated with a layer of the hierarchical taxonomy;
- determining a question answer pair based on a question generated using at least one word of the set of words and at least one content domain to which the question is applied;
- determining a vector representation for the generated question and for content related to the at least one content domain of the question answer pair; and
- embedding the vector representation determined for the generated question and the vector representations generated for the content related to the content domain into a common embedding space such that embedded vector representations for generated questions and embedded vector representations for content related to the content domain that are related, are closer together in the common embedding space than unrelated embedded vector representations;

wherein the common embedding space comprises embedded question answer pairs for each of the at least two layers of the hierarchical taxonomy, such that a relationship between embedded question answer pairs of varying complexity can be determined.

* * * * *